(12) United States Patent
Hirose

(10) Patent No.: US 10,225,494 B2
(45) Date of Patent: Mar. 5, 2019

(54) IMAGE CAPTURING APPARATUS AND CONTROL METHOD THEREOF

(71) Applicant: CANON KABUSHIKI KAISHA, Tokyo (JP)

(72) Inventor: Minoru Hirose, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 15/374,779

(22) Filed: Dec. 9, 2016

(65) Prior Publication Data

US 2017/0171477 A1 Jun. 15, 2017

(30) Foreign Application Priority Data

Dec. 14, 2015 (JP) ................................. 2015-243320

(51) Int. Cl.

| H04N 5/353 | (2011.01) |
|---|---|
| H04N 5/232 | (2006.01) |
| H04N 5/235 | (2006.01) |
| H04N 5/374 | (2011.01) |
| H04N 5/378 | (2011.01) |
| H04N 5/347 | (2011.01) |
| H04N 5/361 | (2011.01) |
| H04N 5/3745 | (2011.01) |

(52) U.S. Cl.
CPC ......... H04N 5/3537 (2013.01); H04N 5/2351 (2013.01); H04N 5/23212 (2013.01); H04N 5/23241 (2013.01); H04N 5/23245 (2013.01); H04N 5/347 (2013.01); H04N 5/361 (2013.01); H04N 5/374 (2013.01); H04N 5/378 (2013.01); H04N 5/37457 (2013.01)

(58) Field of Classification Search
None
See application file for complete search history.

(56) References Cited

U.S. PATENT DOCUMENTS

| 2004/0061801 A1* | 4/2004 | Hata | ........................ G02B 7/28 |
|---|---|---|---|
| | | | 348/350 |
| 2009/0140122 A1* | 6/2009 | Suzuki | ................. H04N 5/3696 |
| | | | 250/201.2 |

(Continued)

FOREIGN PATENT DOCUMENTS

| JP | 2010-219958 A | 9/2010 |
|---|---|---|
| JP | 2013-106194 A | 5/2013 |

*Primary Examiner* — Mark T Monk
(74) *Attorney, Agent, or Firm* — Canon U.S.A., Inc. IP Division

(57) ABSTRACT

Unit pixels that perform photoelectric conversion of light from an object are arrayed in a matrix manner. An image sensor having the unit pixels outputs a first signal for image generation based on an electric charge generated in each of the unit pixels and a second signal for phase difference detection based on an electric charge generated in a partial region of each of the unit pixels. A scanner controls scanning for reading out the first signal and the second signal for each row. The scanner performs first scanning by which the first signal is read out by being thinned out in a first period, and second scanning by which the second signal is read out in a row, in which the first signal is not read out in the first scanning, by being thinned out in each second period with a predetermined thinning rate.

13 Claims, 12 Drawing Sheets

(56) References Cited

U.S. PATENT DOCUMENTS

2014/0146208 A1* 5/2014 Nakajima ............ H04N 5/3696
348/294
2014/0333790 A1* 11/2014 Wakazono ......... H04N 5/23241
348/222.1

* cited by examiner

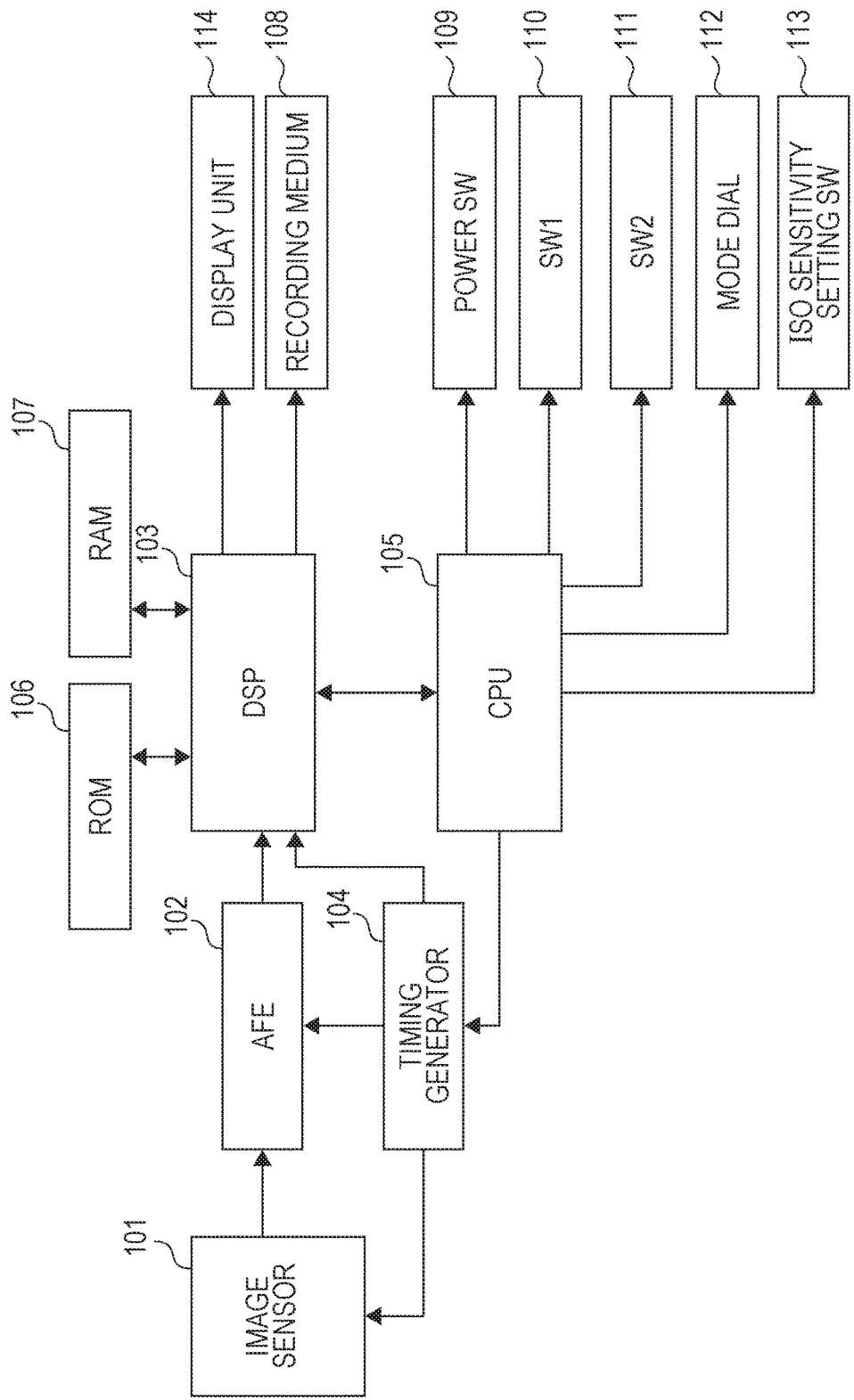

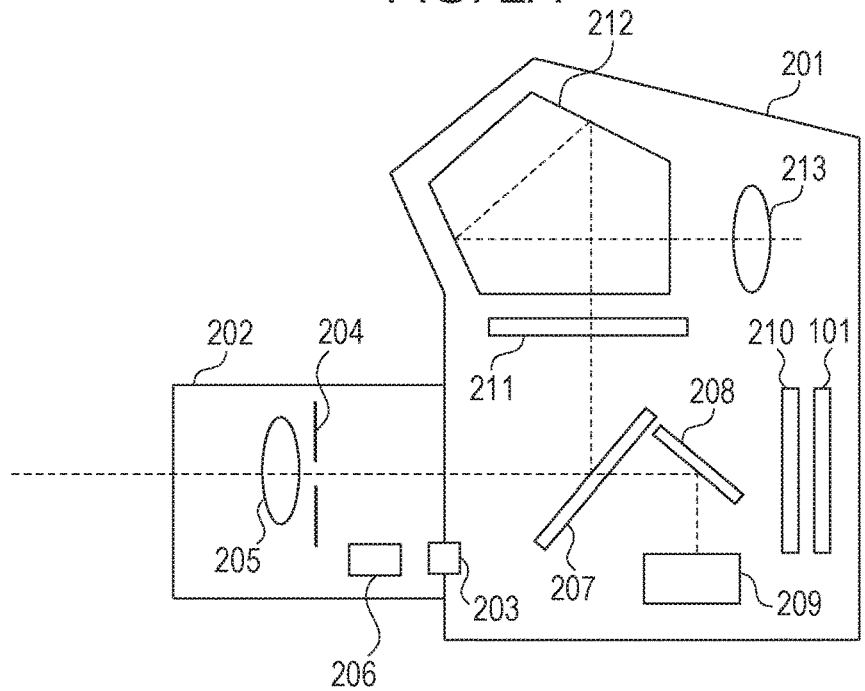
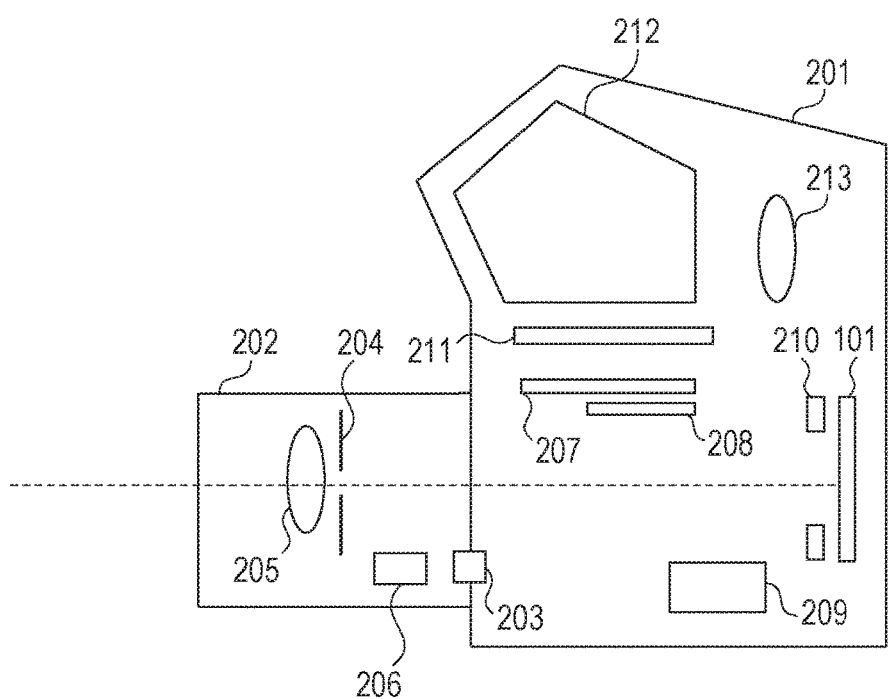

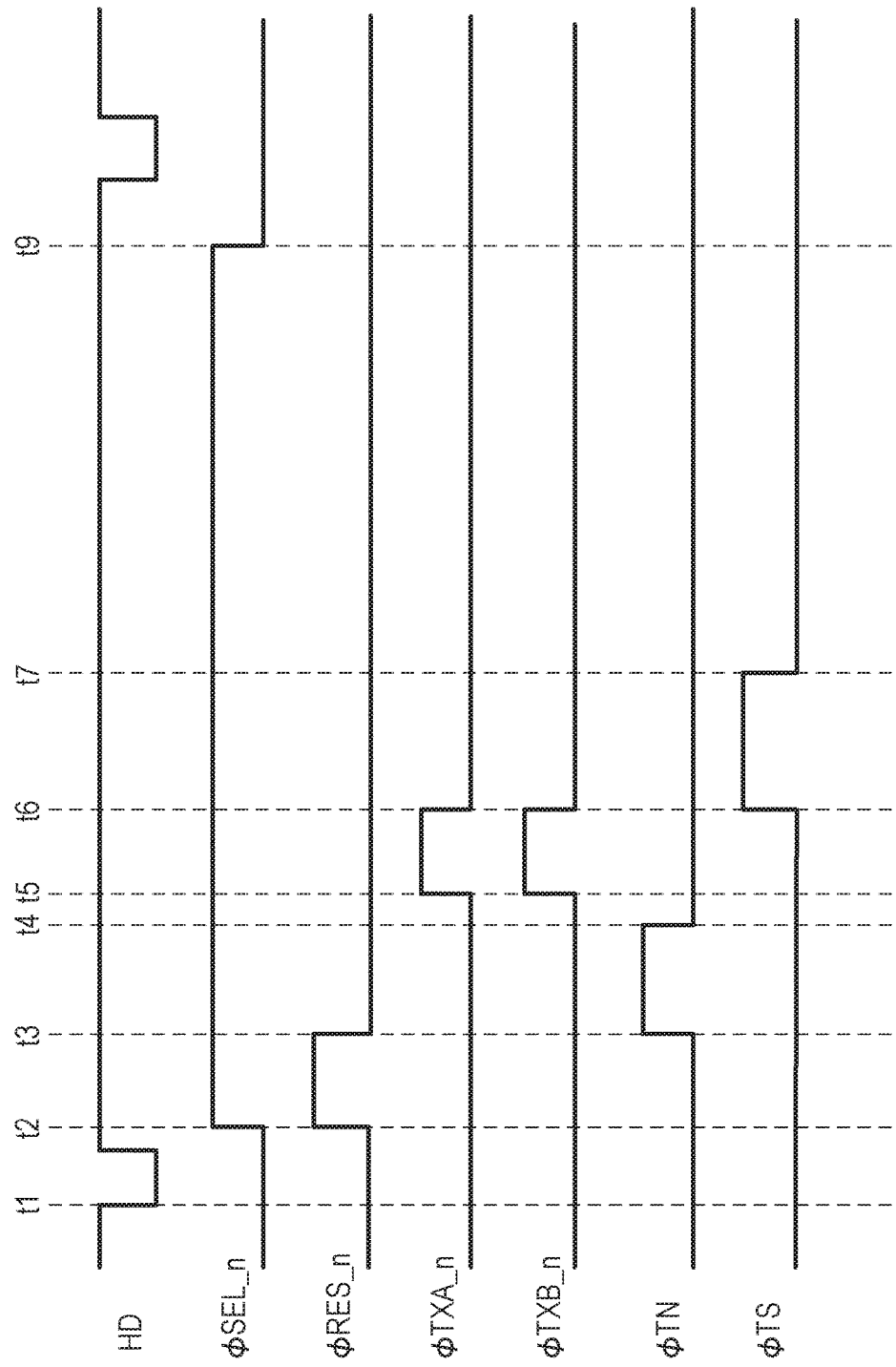

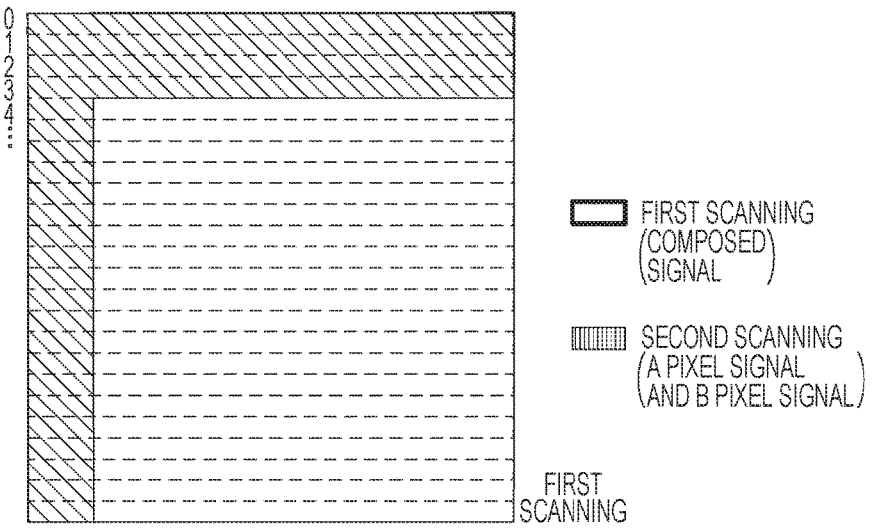
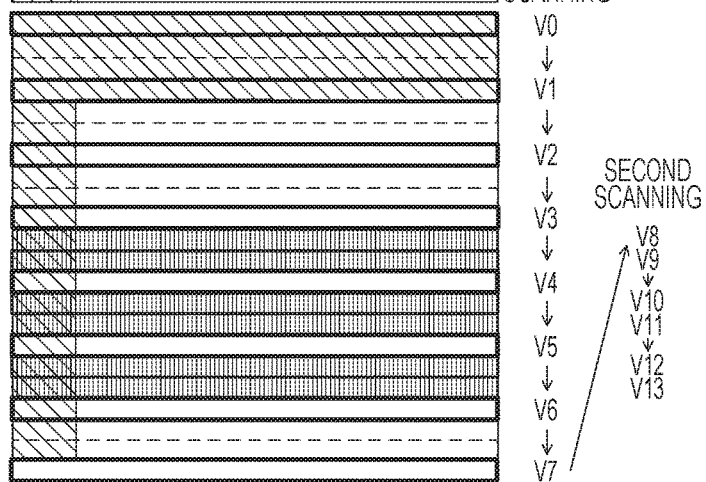
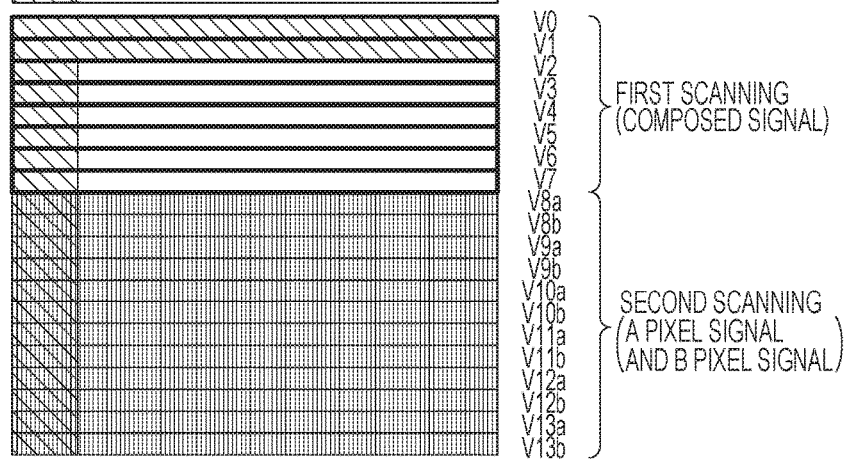

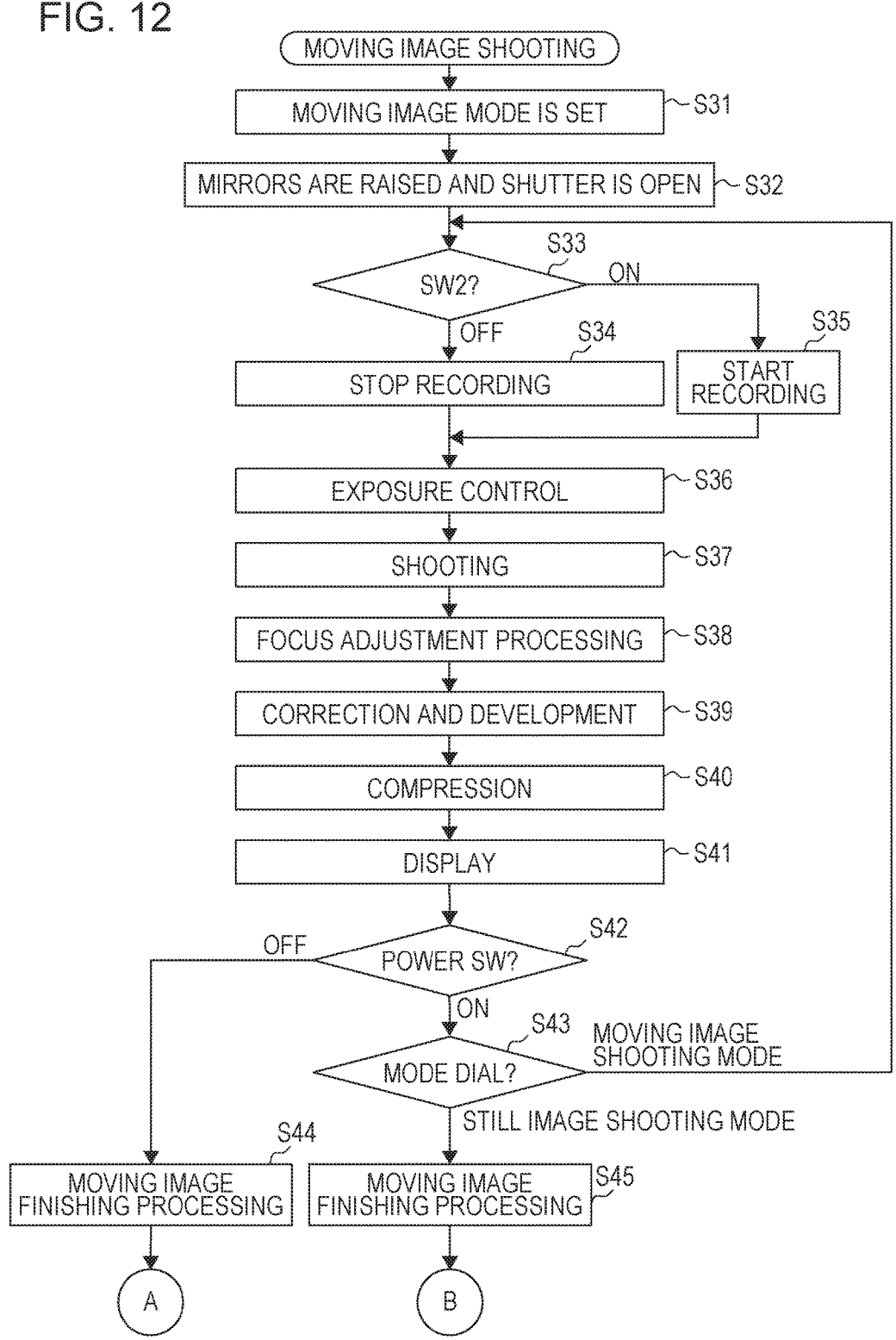

IMAGE CAPTURING APPARATUS AND CONTROL METHOD THEREOF

BACKGROUND OF THE INVENTION

Field of the Invention

One disclosed aspect of the embodiments relates to an image capturing apparatus and a control method thereof, and particularly relates to a focus detection technique.

Description of the Related Art

Conventionally, in automatic focus detection and automatic focus adjustment of an image capturing apparatus, a contrast detection method is known as a general method using a light flux which has passed through a shooting lens. In this method, an image sensor is used as a focus detection sensor, and focus adjustment is enabled by evaluating an output signal of the image sensor and moving a position of the shooting lens so that contrast information thereof indicates a maximum.

However, it takes time since it is necessary to evaluate the contrast information every time the shooting lens is moved, and the shooting lens is moved again to a position at which contrast is the maximum after it is found, as a result of the evaluation, that the contrast is the maximum. Accordingly, a high-speed operation is difficult.

In order to improve such a defect, proposed is a technique with which, by including a phase difference detecting function in an image sensor, a defocus amount of a shooting lens is able to be directly obtained while the image sensor is used as a focus detection element.

For example, in Japanese Patent Laid-Open No. 2010-219958, a pupil-dividing function is provided by offsetting a sensitive region of a light-receiving portion with respect to an optical axis of an on-chip micro lens in some light-receiving elements in an image sensor. Then, by arranging pixels, which have the light-receiving elements, at predetermined intervals in the image sensor, the phase difference detecting function is realized.

In addition, for example, in Japanese Patent Laid-Open No. 2013-106194, a plurality of photoelectric conversion elements of an A pixel and a B pixel are provided in each pixel corresponding to one of micro lenses of an image sensor and an A pixel output and an A+B pixel output are read out. By performing subtraction processing of these two outputs, a B pixel output is obtained, and the phase difference detecting function is realized.

In Japanese Patent Laid-Open No. 2010-219958, disclosed is an idea that, only in a row in which a phase difference detection pixel is arranged, a reset line of so-called rolling shutter driving is independently scanned in each of a row of a normal pixel and a row including the phase difference detection pixel. In this case, a readout method of a signal in an inside of the image sensor is not different between the phase difference detection pixel and the normal pixel which are arranged in the same row. However, in Japanese Patent Laid-Open No. 2010-219958, the phase difference detection pixel is not allowed to be used as the normal pixel, so that it is difficult to extremely increase a proportion of arrangement of the phase difference detection pixel. Thus, resolution for phase difference detection is lowered.

On the other hand, in Japanese Patent Laid-Open No. 2013-106194, by forming all of pixels with the plurality of photoelectric conversion elements, all of the pixels become usable as phase difference detection elements. Therefore, resolution in a horizontal direction is also improved. However, since an A+B signal and an A signal are read out from the plurality of photoelectric conversion elements of all of the pixels, the image sensor requires a readout circuit by which each of A+B pixels and A pixels is read out. Particularly, since twice as much as a holding capacitance, which requires a relatively large area in the image sensor, is required and control lines become complicated, it is feared that a circuit area in a peripheral part of the image sensor is increased.

In addition, as described in Japanese Patent Laid-Open No. 2013-106194, in the image sensor in which all of imaging pixels of the image sensor are formed with a plurality of photoelectric conversion element units, a circuitry in a peripheral readout circuit becomes complicated, and, particularly, a circuit element having a relatively large area, such as the holding capacitance, is to be required.

Furthermore, a whole system requires a mechanism by which the A signal is subtracted from the A+B signal to calculate a B signal, so that there are problems of a size of circuit scale and cost. In addition, since reading out the A+B signal and the A (or B) signal is simply equivalent to doubling the number of pixels, a double readout time is required. In this way, a write time to a column circuit is increased and a horizontal transfer time is simply doubled, so that a problem that high-speed readout becomes difficult is caused.

Note that, in the case of not trying to read out both of the A+B signal and the A signal from all of the pixels but trying to read out both of the A+B signal and the A signal only from a specified row, a horizontal transfer time becomes longer only in the specified row. However, when changing a horizontal synchronizing period only in the specified row, a circuit scale of a processing circuit of a readout signal is increased and made complicated.

A technique by which, in an image capturing apparatus, a phase difference detecting function is included in an image sensor and a defocus amount of a shooting lens is thereby able to be obtained has been proposed.

For example, in Japanese Patent Laid-Open No. 2010-219958, the pupil-dividing function is provided by offsetting the sensitive region of the light-receiving portion with respect to the optical axis of the on-chip micro lens in some light-receiving elements in the image sensor. Then, by arranging pixels, which have the light-receiving elements, at predetermined intervals in the image sensor, the phase difference detecting function is realized.

Moreover, for example, in Japanese Patent Laid-Open No. 2013-106194, the plurality of photoelectric conversion elements of the A pixel and the B pixel are provided in each pixel corresponding to one of the micro lenses of the image sensor and the A pixel output and the A+B pixel output are read out. Then, by performing the subtraction processing of the A pixel output and the A+B pixel output, the B pixel output is obtained, and the phase difference detecting function is realized.

SUMMARY OF THE INVENTION

An image capturing apparatus includes an image sensor and a scanner. In the image sensor, unit pixels that perform photoelectric conversion of light from an object are arrayed in a matrix manner. The image sensor outputs a first signal for image generation based on an electric charge generated in each of the unit pixels and a second signal for phase difference detection based on an electric charge generated in a partial region of each of the unit pixels. The scanner controls scanning for reading out the first signal and the second signal for each row. The scanner performs first scanning by which the first signal is read out by being thinned out in a first period, and second scanning by which the second signal is read out in a row, in which the first signal is not read out in the first scanning, by being thinned out in each second period with a predetermined thinning rate.

Further features of the disclosure will become apparent from the following description of exemplary embodiments with reference to the attached drawings.

BRIEF DESCRIPTION OF THE DRAWINGS

FIG. 1 is a block diagram illustrating a configuration of an image capturing apparatus in a first exemplary embodiment.

FIGS. 2A and 2B are side sectional views each illustrating a schematic configuration of the image capturing apparatus in the first exemplary embodiment.

FIG. 7 is a timing chart illustrating driving of the image sensor in a case where phase difference detection is not performed in the first exemplary embodiment.

FIGS. 8A, 8B, and 8C are schematic diagrams for explaining a readout method of the image sensor in the first exemplary embodiment.

FIG. 12 is a flowchart illustrating moving image shooting processing in the first exemplary embodiment.

DESCRIPTION OF THE EMBODIMENTS

Figure 3:
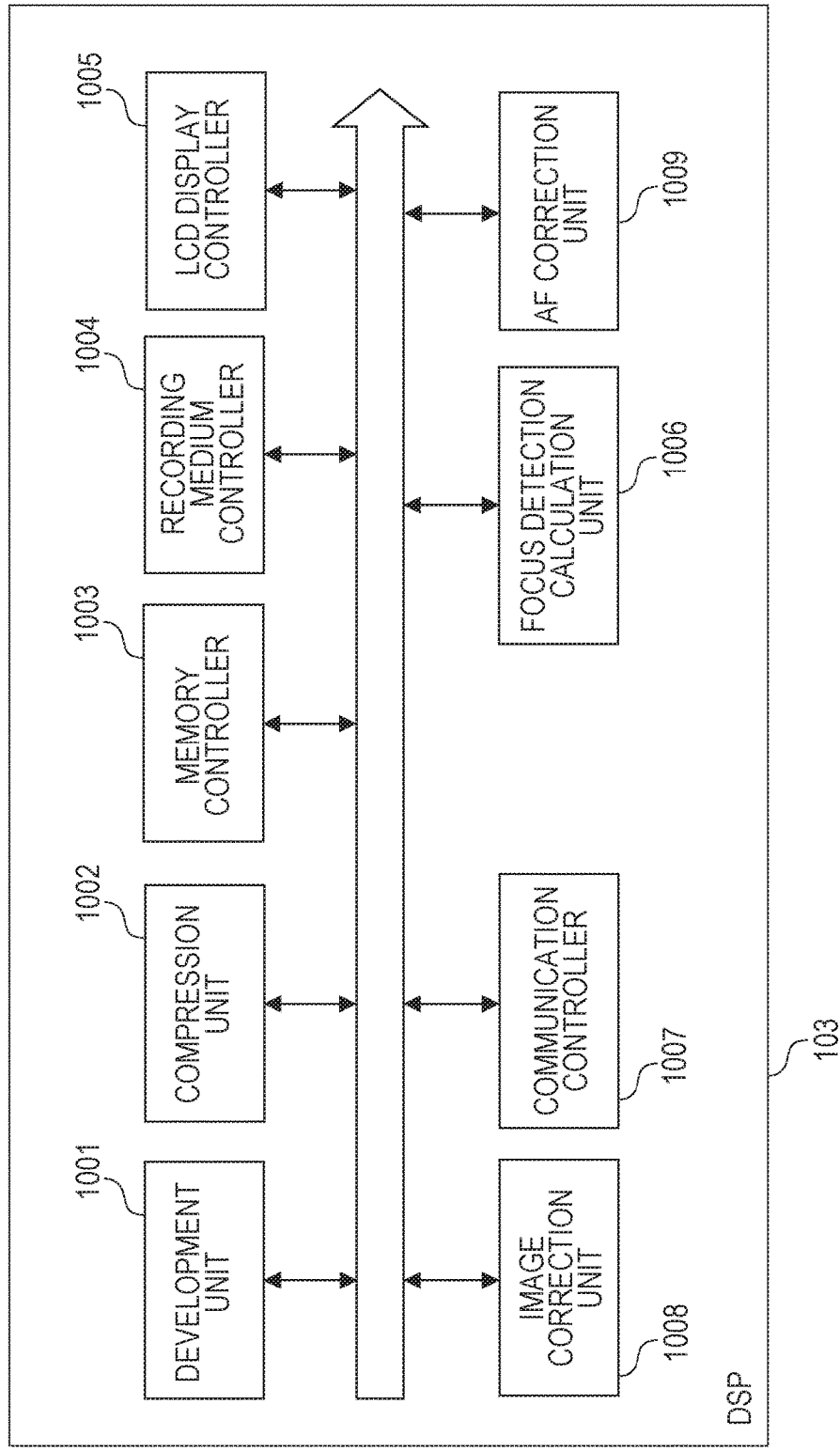
FIG. 3 is a block diagram illustrating a function inside a DSP in the first exemplary embodiment.

Hereinafter, an embodiment will be described in detail with reference to appended drawings. However, dimensions, shapes, relative positions, and the like of constituent components exemplified in the embodiment are to be modified as appropriate in accordance with a configuration of an apparatus to which the embodiment is applied or various conditions, and the embodiment is not limited to the exemplification.

<First Exemplary Embodiment>

In a first exemplary embodiment, description will be given for a method of reading out a necessary pixel signal with accuracy sufficient for phase difference detection, without increasing a circuit scale, cost, or a readout time of an image sensor and without deteriorating quality of an image. Moreover, description will be given also for a method of improving AF performance by switching readout of a phase difference detection pixel in accordance with a shooting condition of a focus detection operation.

FIG. 1 is a block diagram of an image capturing apparatus according to the first exemplary embodiment. An image sensor 101 performs photoelectric conversion of a photographic light flux which has passed through an exit pupil of an optical system (not illustrated) and been formed. The image sensor 101 incorporates therein an amplifier circuit (not illustrated) which switches gain in accordance with ISO sensitivity. An analog front end (AFE) 102 incorporates therein an A/D converter which converts an analog signal from the image sensor 101 into a digital signal, and has a function of clamping a dark offset level.

A DSP (Digital Signal Processor) 103 performs various correction processing, development processing, and compression processing on a data signal output from the AFE 102. Moreover, the DSP 103 is also able to perform various correction processing on image data in a RAM 107. Further, the DSP 103 performs correction processing on various noise generated in the image sensor 101, detection of a defective pixel and correction processing on outputs from the defective pixel and a phase difference detection pixel, correction processing on a peripheral pixel of the phase difference detection pixel, and the like. In addition, the DSP 103 performs calculation processing in which autofocus information is calculated by using the output from the phase difference detection pixel. Note that, the processing above will be described in detail below.

Moreover, the DSP 103 performs access processing to various memories such as a ROM 106 and the RAM 107, write processing of image data on a recording medium 108, display processing of various data on a display unit 114, and the like. Note that, though an example of a combination of the image sensor 101 of a CMOS type and the AFE 102, output of which is analog, is described in the first exemplary embodiment, an image sensor of a CMOS type, output of which is digital and which is directly connected to the DSP 103, may be used.

A timing generator 104 supplies clock signals and control signals to the image sensor 101, the AFE 102, and the DSP 103 under control of a CPU 105, and generates timing signals corresponding to various readout modes of the image sensor 101 in cooperation with the DSP 103. The CPU 105 performs control of the DSP 103 and the timing generator 104 and control of a camera function such as photometry and focus adjustment. For the focus adjustment, it is possible to perform AF using an output of an image sensor (not illustrated) which is configured separately from the image sensor 101 and with which phase difference AF is performed, AF using autofocus information which is calculated by using an output of a phase difference detection pixel incorporated in the image sensor 101, and the like.

Various switches such as a power switch 109, a shutter switch SW1 (110) in a first stage, a shutter switch SW2 (111) in a second stage, a mode dial 112, and an ISO sensitivity setting switch 113 are connected to the CPU 105. The CPU 105 executes processing corresponding to setting statuses of the switches and the dial.

The ROM 106 stores a control program of the image capturing apparatus, that is, a program to be executed by the CPU 105, various correction data, and the like, and is generally constituted by a flash memory. The RAM 107 is configured so as to be able to be accessed more quickly than the ROM 106. The RAM 107 is used as a work area, and temporarily stores image data to be processed by the DSP 103, and the like. As the recording medium 108, for example, a memory card which saves image data, which is obtained by shooting, or the like is used, and the recording medium 108 is connected to the DSP 103 via, for example, a connector not illustrated. The display unit 114 constituted by an LCD or the like is used for displaying information of the image capturing apparatus, and playing back and displaying an image obtained by shooting, or displaying moving image data.

The power switch 109 is operated by a user when activating the image capturing apparatus. When a release button not illustrated is operated and the shutter switch SW1 (110) in the first stage is thereby turned on, pre-processing before shooting, which includes photometry processing and range-finding processing, is executed. Further, when the shutter switch SW2 (111) in the second stage is turned on, a series of image capturing operations, in which mirrors and a shutter which are not illustrated are driven and image data obtained by image capturing by the image sensor 101 is written in the recording medium 108 via the AFE 102 and DSP 103, is started. The mode dial 112 is used for setting various operation modes of the image capturing apparatus. The ISO sensitivity setting switch 113 is used for setting shooting ISO sensitivity of the image capturing apparatus.

FIGS. 2A and 2B are side sectional views each illustrating a schematic configuration of the image capturing apparatus illustrated in FIG. 1. In the image capturing apparatus, there are a state when an optical viewfinder with which shooting for a still image is performed is used and a state when a moving image is obtained by shooting or live view is used, in which the mirrors are raised and the shutter is open. FIG. 2A illustrates the state when the optical viewfinder is used and FIG. 2B illustrates the state when a moving image is obtained by shooting or live view is used, in which the mirrors are raised and the shutter is open.

As illustrated in FIGS. 2A and 2B, the image capturing apparatus in the first exemplary embodiment is mainly composed of a camera main body 201 and a shooting lens 202 which is mounted on a front face of the camera main body 201. The shooting lens 202 is interchangeable, and the camera main body 201 and the shooting lens 202 are electrically connected via a mount contact-point group 203. An aperture 204, a focus adjustment lens group 205, and the like are arranged in the shooting lens 202 and controlled by a lens controller 206.

The camera main body 201 has a main mirror 207 which is a half mirror. In the state when the optical viewfinder is used, which is illustrated in FIG. 2A, the main mirror 207 is arranged obliquely on a photographic optical path, and reflects light from the shooting lens 202 to a viewfinder optical system. The reflected light is projected onto a focusing plate 211. A shooter is able to check an object image, which is projected onto the focusing plate 211, via a pentaprism 212 for changing the optical path and an eyepiece lens group 213.

Meanwhile, a part of the light which has been transmitted through the main mirror 207 enters an AF unit 209 via a sub mirror 208. The AF unit 209 is an AF sensor of a phase difference detection method. Although a detailed description of the phase difference AF will be omitted, an AF operation is performed by controlling the focus adjustment lens group 205 of the shooting lens 202 based on a detection result thereof.

When the SW1 (110) is pressed halfway and turned on in synchronism with the not-illustrated release button, shooting preparation operations such as AE and AF are performed. When the SW2 (111) is pressed fully and turned on, the main mirror 207 and the sub mirror 208 operate so as to retract from the optical path as illustrated in FIG. 2B, and then a focal plane shutter 210 is opened for a predetermined time to expose the image sensor 101. Note that, the focal plane shutter 210 is normally in a closed state as illustrated in FIG. 2A, and performs an opening operation so as to perform exposure for a designated time only during shooting.

When a mode is switched by the mode dial 112, for example, to a live view state, similarly to shooting of a still image when the SW2 (111) is turned on, the main mirror 207 and the sub mirror 208 retract from the optical path as illustrated in FIG. 2B and hold this state. Furthermore, the focal plane shutter 210 also holds the open state, and the image sensor 101 is brought into a state of being exposed at all times. A signal obtained from the image sensor 101 is displayed on the display unit 114, and a live view mode is thereby realized. Moreover, by recording a moving image in this state, it is possible to cope with a moving image mode.

In this case, since the sub mirror 208 has also retracted from the optical path, no object image enters the AF unit 209, so that the phase difference AF using the AF unit 209 becomes impossible. In addition, since the main mirror 207 has also retracted from the optical path, it is not possible to check an object image by using the optical viewfinder.

Next, a configuration of the DSP 103 will be described with reference to FIG. 3. In addition to a development unit 1001 and compression unit 1002 which serve as the basis of image processing described above, the DSP 103 includes a memory controller 1003, a recording medium controller 1004, and an LCD display controller 1005. The DSP 103 further includes a focus detection calculation unit 1006 which calculates autofocus information from an output from a phase difference detection pixel described below, and a communication controller 1007 which transmits the calculated autofocus information to the CPU 105 and generally performs two-way communication with the CPU 105.

The DSP 103 also includes an image correction unit 1008 which digitally corrects an error of sensitivity or a dark level from an ideal state of the image sensor 101 when performing image generation, and, furthermore, an AF correction unit 1009. In order to calculate the autofocus information from the output of the phase difference detection pixel, the AF correction unit 1009 digitally performs correction of optical conditions before sending data to the focus detection calculation unit 1006. Examples of the correction of the optical conditions include correction of an error of sensitivity or a dark level from an ideal state of the phase difference detection pixel, and a focal length and an aperture value of the shooting lens 202 during shooting.

Figure 4:
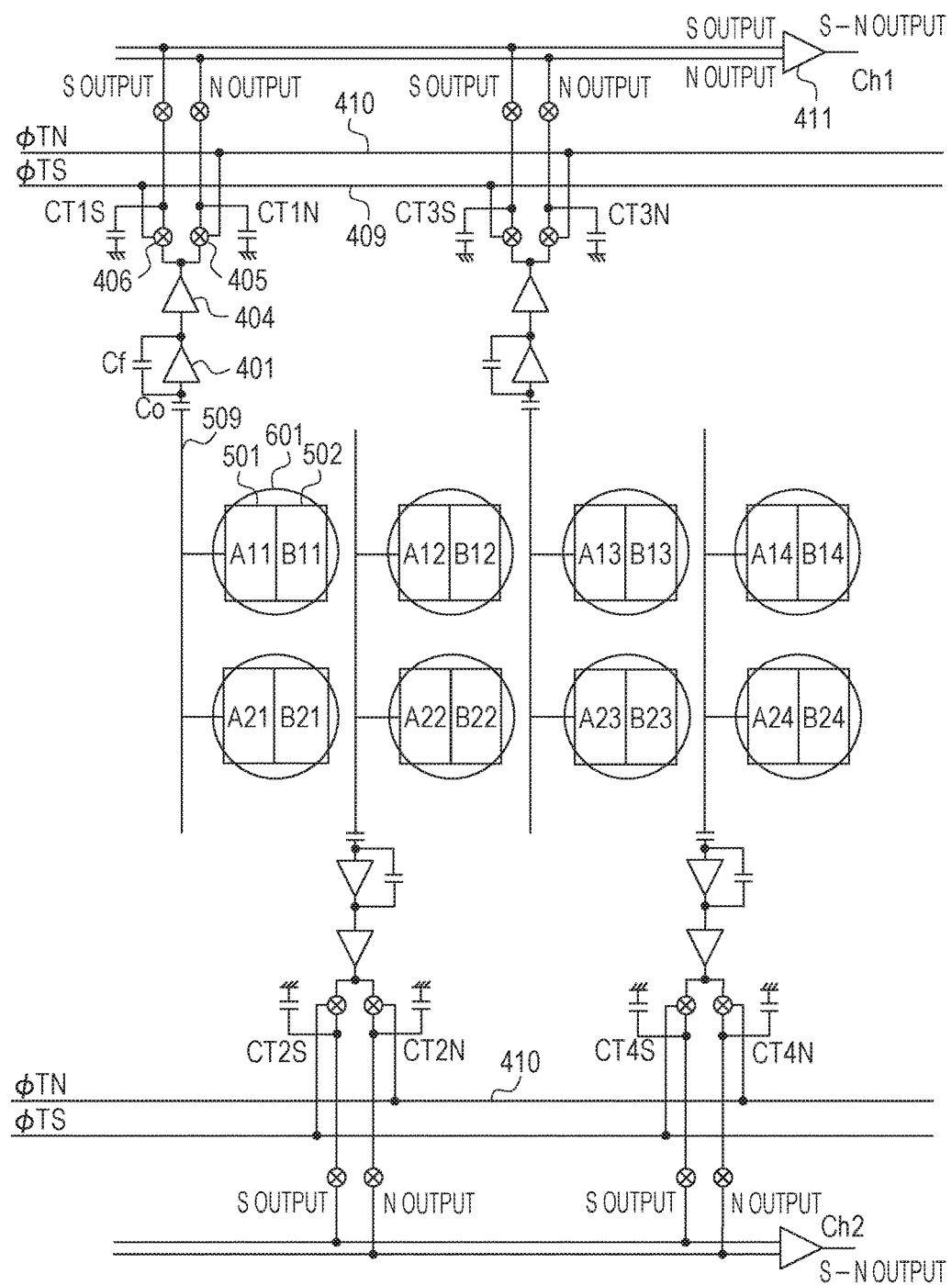
FIG. 4 is a circuit diagram of an image sensor in the first exemplary embodiment.

A pixel structure of the image sensor 101 will be described next. FIG. 4 is an equivalent circuit diagram illustrating an example of a configuration of the image sensor 101 in the first exemplary embodiment. In a pixel region, unit pixels each of which includes a plurality of photoelectric conversion units are arrayed in a matrix manner at equal intervals in horizontal and vertical directions. The image sensor 101 outputs a signal for image generation (first signal) based on an electric charge generated in each of the unit pixel and a signal for phase difference detection (second signal) based on an electric charge generated in a partial region (pupil region) obtained by dividing the unit pixel.

Figure 5:
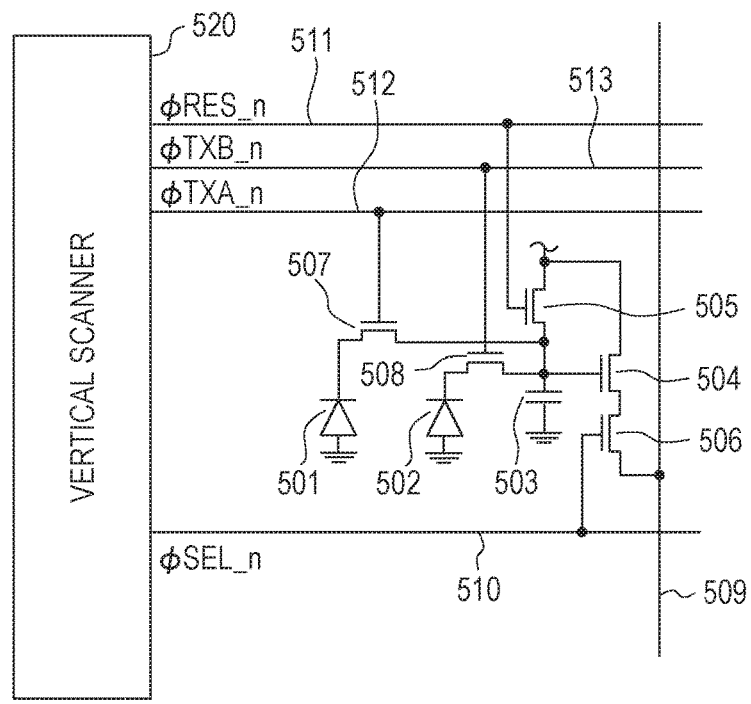
FIG. 5 is a circuit diagram of a unit pixel of the image sensor in the first exemplary embodiment.
Figure 6:
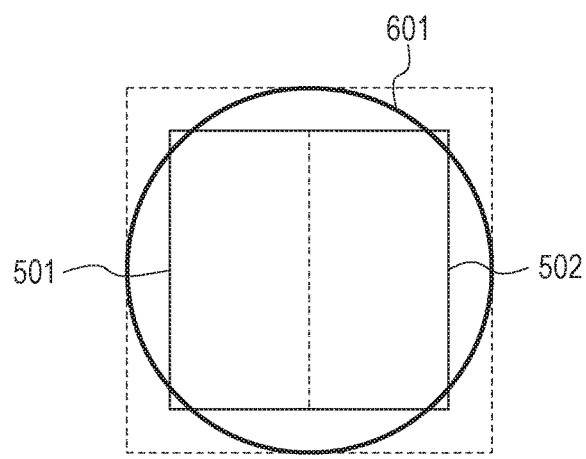
FIG. 6 is a plan view of the image sensor in the first exemplary embodiment.

A configuration of the unit pixel will be described here. FIG. 5 is an equivalent circuit diagram for explaining the configuration of a unit pixel in an nth row of the image sensor 101, and FIG. 6 is a plan view of the unit pixel. In FIG. 5 and FIG. 6, each of a photoelectric conversion unit 501 and a photoelectric conversion unit 502 is composed of a photodiode. The photoelectric conversion units 501 and 502 are separately arranged in a region corresponding to one micro lens 601 which is arranged above the unit pixel. For convenience, the photoelectric conversion unit 501 and the photoelectric conversion unit 502 are called an A pixel and a B pixel, respectively. The micro lens 601 is configured so as to be in contact with a pixel pitch indicated with a dotted line.

Each of the A pixel and the B pixel is arranged so as to be offset with respect to the micro lens 601, and therefore performs photoelectric conversion of an object image which has passed through a divided pupil region. This makes it possible to perform phase difference detection by reading out an A pixel output and a B pixel output, so that a focus detection operation is enabled. That is, the A pixel and the B pixel are phase difference detection pixels.

Electric charges generated in the photoelectric conversion units 501 and 502 are transferred to an FD unit (floating diffusion unit) 503 via transfer transistors 507 and 508, respectively. The FD unit 503 is connected to a gate of an amplifying transistor 504 to constitute a pixel amplifier and to function as an electric charge/voltage conversion unit.

The transfer transistors 507 and 508 are controlled with a control signal φTXA_n which is output from a vertical scanner 520 to a control line 512 and a control signal φTXB_n which is output to a control line 513, respectively. The transfer transistors 507 and 508 are respectively turned on when the control signals φTXA_n and φTXB_n are at H (a high level), and respectively turned off when the control signals φTXA_n and φTXB_n are at L (a low level). Note that, n in each of the control signals φTXA_n and φTXB_n denotes a row, and, for example, the control signal φTXA_n means a control signal φTXA to be output to a unit pixel in the nth row.

Moreover, by setting a reset signal φRES_n, which is output to a control line 511 from the vertical scanner 520, at H, a reset transistor 505 is turned on, and it is thereby possible to reset the FD unit 503. In addition, it is possible to reset the electric charges of the photoelectric conversion units 501 and 502, which are accumulated during a period in which the control signals φTXA_n and φTXB_n are at H.

When a control signal φSEL_n which is output to a control line 510 from the vertical scanner 520 becomes at H, a selection transistor 506 is turned on, and an output of the amplifying transistor 504 appears in a vertical output line 509. A constant current source which is not illustrated is connected to vertical output lines 509, and the vertical output lines 509 constitute a source follower circuit with amplifying transistors 504 of respective columns, which are connected to the vertical output lines 509.

FIG. 4 is a schematic diagram illustrating a case where the above-described unit pixels are arranged so that four pixels are arranged in a horizontal direction and two pixels are arranged in a vertical direction. Note that, an actual image sensor has about several hundreds of thousands to several tens of millions of such pixels arranged therein. FIG. 4 schematically illustrates the micro lens 601 and the A pixel and the B pixel therebelow in each of the unit pixels. Each of the unit pixels is connected to the vertical output line 509 in each column.

Each of the vertical output lines 509 is connected to a column amplifier 401 which is prepared for each column. The column amplifier 401 multiplies an output of each of the vertical output lines 509 by predetermined gain which is defined in accordance with an input capacitance C0 and a feedback capacitance Cf, and outputs the resultant to a follower 404 in a succeeding stage. The follower 404 outputs this output to a noise component holding capacitance CTkN or a signal component holding capacitance CTkS via an analog switch 405 or 406. Note that, k denotes a column in an example illustrated in FIG. 4, and k=1 to 4 is satisfied. The analog switches 405 and 406 are controlled with control signals φTS and φTN output to control lines 409 and 410 from a not-illustrated vertical scanner, respectively.

The noise component holding capacitance CTkN and the signal component holding capacitance CTkS in each column, which respectively hold a noise component and a signal component of a pixel of the nth row, are sequentially connected to an input of an output amplifier 411 by a not-illustrated horizontal scanner. For example, when holding capacitances CT1N and CT1S are connected to the output amplifier 411, the output amplifier 411 multiplies a differential value of a voltage in a first row by a predetermined gain, and outputs the resultant to an outside of the image sensor 101. Holding capacitances CT3N and CT3S are connected to the output amplifier 411 at the next time by the horizontal scanner. This is repeated as many times as the number of columns in one row, and then a horizontal scanning operation of one row is finished. By sequentially performing this operation in a selected range of a specified row of the image sensor 101 in a vertical direction, it becomes possible to obtain an output of predetermined pixels of the image sensor 101.

At this time, in a case where outputs of both of the A pixel and the B pixel of each unit pixel are transferred at the same time, it is possible to output an electric charge signal which is generated in an entirety of the pixel arranged under the same micro lens 601 and which is suitable for image generation.

Differently from the image sensor of Japanese Patent Laid-Open No. 2013-106194, a column circuit of the first exemplary embodiment requires only one pair of the noise component holding capacitance CTkN and the signal component holding capacitance CTkS with which an A+B signal, or an A signal or a B signal is read out. That is, in the column circuit of the first exemplary embodiment, the column circuit does not separate a photoelectric conversion element for phase difference detection, and therefore has a circuit configuration same as that of a normal image sensor which does not perform phase difference detection.

Case where Phase Difference Detection is not Performed

First, an operation in a case where phase difference detection is not performed will be described based on a timing chart illustrated in FIG. 7. In FIG. 7, when a horizontal synchronization signal HD is input at a time t1, φSEL_n which selects a pixel group in the nth row becomes at H at a time t2 after a predetermined time period, and the selection transistor 506 of each of pixels in the nth row is turned on. Thereby, a signal according to an input of the amplifying transistor 504 appears in the vertical output line 509.

At the same time, a reset signal φRES_n of each of the pixels in the nth row becomes at H, and the reset transistor 505 of each of the pixels of the nth row is turned on. Thereafter, the reset signal φRES_n becomes at L at a time t3 after a predetermined time period, and a reset operation is released. Then, a signal level in a state where the reset is released appears in the vertical output line 509.

At the same time, the control signal φTN becomes at H at the time t3, and a signal obtained by amplifying, by the column amplifier 401, the signal level of the vertical output line 509 when the reset is released appears in the noise component holding capacitance CTkN. When the control signal φTN becomes at L at a time t4, the signal level after the reset is released is to be held in the noise component holding capacitance CTkN.

Next, in order to turn on the respective transfer transistors 507 and 508 of an A pixel and a B pixel of each of the pixels in the nth row, the control signals φTXA_n and φTXB_n become at H at a time t5. With this operation, signal charges of the A pixel and the B pixel are transferred to the FD unit 503 together.

The control signals φTXA_n and φTXB_n become at L at a time t6 after a predetermined time period, and thereby the transfer transistors 507 and 508 are turned off. Further, the control signal φTS becomes at H. Thereby, a signal level of the vertical output line 509, which is according to the signal charges, is amplified by the column amplifier 401, and appears in the signal component holding capacitance CTkS. Then, when φTS becomes at L at a time t7, the signal level according to the signal charges is to be held in the signal component holding capacitance CTkS.

At this point, an output of each of the pixels in the nth row immediately after the reset is released is held in the noise component holding capacitance CTkN in a corresponding column, and an output according to the signal charges is held in the signal component holding capacitance CTkS in the corresponding column. Thereafter, the noise component holding capacitance CTkN and the signal component holding capacitance CTkS of each column are sequentially connected to the output amplifier 411 by a not-illustrated horizontal transfer circuit. Then, by multiplying a differential value of the noise component holding capacitance CTkN and the signal component holding capacitance CTkS by the predetermined gain and outputting the resultant, readout of each signal (composed signal) obtained from the A pixel+the B pixel in the nth row is completed. In a case where phase difference detection is not necessary, it is possible to realize the readout by performing the readout operation described above.

A concept of the driving method described above is illustrated in FIG. 8A. FIG. 8A is a view illustrating a pixel region of the image sensor 101. A hatched part in a left side and an upper side in a pixel region illustrated in each of FIGS. 8A, 8B, and 8C indicates an optical black part (OB part) which is shielded from light. Moreover, in a left side of the pixel region of FIG. 8A, row numbers are indicated. As described above, in the case where phase difference detection is not performed, a composed signal of an A pixel+a B pixel is read out from each of all pixels which constitute a pixel region.

Case where Phase Difference Detection is Performed

Next, an operation of a case where phase difference detection is performed will be described. In a case where phase difference detection is performed in the first exemplary embodiment, first, composed signals each of which is obtained from an A pixel+a B pixel are read out in a vertical direction while performing thinning in a first period. This first time scanning is referred to as a "first scanning" below. After scanning a whole surface in the vertical direction, vertical scanning is returned again to a row in an upper part in the vertical direction, and scanning is performed again for a row which has not been read out in the first scanning, while performing thinning in a second period. This second time scanning is referred to as a "second scanning". In the first scanning, a composed signal for image generation is read out from each of unit pixels in a target row. On the other hand, in the second scanning, a signal for phase difference detection is sequentially read out from an A pixel and a B pixel in each of unit pixels in a target row. Then, an image is generated by using the read composed signal, and phase difference detection is performed by using the phase difference detection signal. Since such a readout method is suitable to be used for a moving image mode in which resolution of an image to be obtained by shooting is low and which requires a small number of rows targeted for readout compared with a still image mode, it is assumed in the first exemplary embodiment that the method is applied to the moving image mode, but there is no limitation thereto.

FIG. 8B illustrates a schematic view of rows to be read out in a case where the first scanning and the second scanning are performed. In FIG. 8B, rows each of which is surrounded by a thick frame are rows targeted for readout in the first scanning, and the other rows are rows in which, in the first scanning, readout is not performed and thinning is performed. In addition, in FIG. 8B, rows in each of which a pattern of vertical lines is added are rows targeted for readout in the second scanning.

In an example illustrated in FIG. 8B, the vertical scanner 520 reads out composed signals from A pixels and B pixels in a V0th row, and then reads out composed signals from a V1st row after the first period (in FIG. 8B, after three rows). Continuously, the vertical scanner 520 sequentially reads out composed signals from V2nd, V3rd, V4th, V5th, V6th, and V7th rows in the same first period. This readout from the V0th row to the V7th row is the first scanning. Each of the rows in which readout is performed in the first scanning is to output an electric charge signal which is generated in an entirety of a pixel arranged under the same micro lens 601 and which is suitable for image generation, and an image is generated from the composed signals of the V0th to V7th rows.

Note that, since readout is performed in the first exemplary embodiment without thinning in a column direction (horizontal direction), the numbers of pixels of readout are different between the horizontal direction and the vertical direction, so that an aspect ratio of an image becomes different. However, conversion of the aspect ratio may be performed in a succeeding stage, or general thinning readout with the same ratio or addition thinning readout may be performed also in the horizontal direction, and it is possible to convert the aspect ratio with any method.

After performing readout up to the V7th row in the first scanning, the vertical scanner 520 returns to a V8th row, and, first, reads out a phase difference detection signal from each A pixel among pixels included in the V8th row. Continuously, the vertical scanner 520 reads out a phase difference detection signal from each B pixel among the pixels included in the same V8th row. Then, the vertical scanner 520 reads out a phase difference detection signal from each A pixel among pixels included in a V9th row after the second period (in FIG. 8B, after one row). Continuously, the vertical scanner 520 reads out a phase difference detection signal from each B pixel among the pixels included in the same V9th row. Thereafter, the vertical scanner 520 skips the V4th row in which readout has been performed in the first scanning, and reads out A pixels and B pixels in a V10th row after the next second period (after one row), and A pixels and B pixels in a V11th row after the further next second period (after one row). Similarly, the vertical scanner 520 skips a V5th row in which readout has been performed in the first scanning, and performs readout in a V12th row and a next V13th row sequentially. This readout from the V8th row to the V13th row is the second scanning.

In this manner, in the second scanning, signals from A pixels and signals from B pixels are separately read out in the same row. Note that, in a case where a pixel region in which focus detection is performed is set as a focus detection region in advance, a narrowest row range which includes this focus detection region can be set as a target row range of the second scanning. For example, in FIG. 8B, in a case where the focus detection region is set in advance in a range from the V8th row to the V13th row, the range from the V8th row to the V13th row is the target row range of the second scanning as the above-described operation. Note that, the focus detection region may be set by designating a desired region with a not-illustrated operation unit by a user, may be automatically set with a known method of object detection or the like, or may be a fixed region. By shortening the second period of scanning in the vertical direction in the second scanning, it is possible to expect a noise reduction effect at a time of phase difference detection. On the other hand, by lengthening the second period, a readout time is shortened, so that it becomes possible to cope with a high-speed frame rate.

FIG. 8C is a schematic view obtained by changing pixel arrangement in an order of being read out and processed in this manner. As described above, since, for the V0th to the V7th rows, the composed signals are read out from the A pixels and the B pixels in the first scanning, it is possible to perform normal image generation by using the composed signals. On the other hand, since, for the V8th to the V13th rows, the phase difference detection signals are read out from the A pixels and the B pixels in the second scanning, it is possible to perform phase difference detection by using pairs of an A pixel output and a B pixel output which are obtained in each same row.

Figure 9:
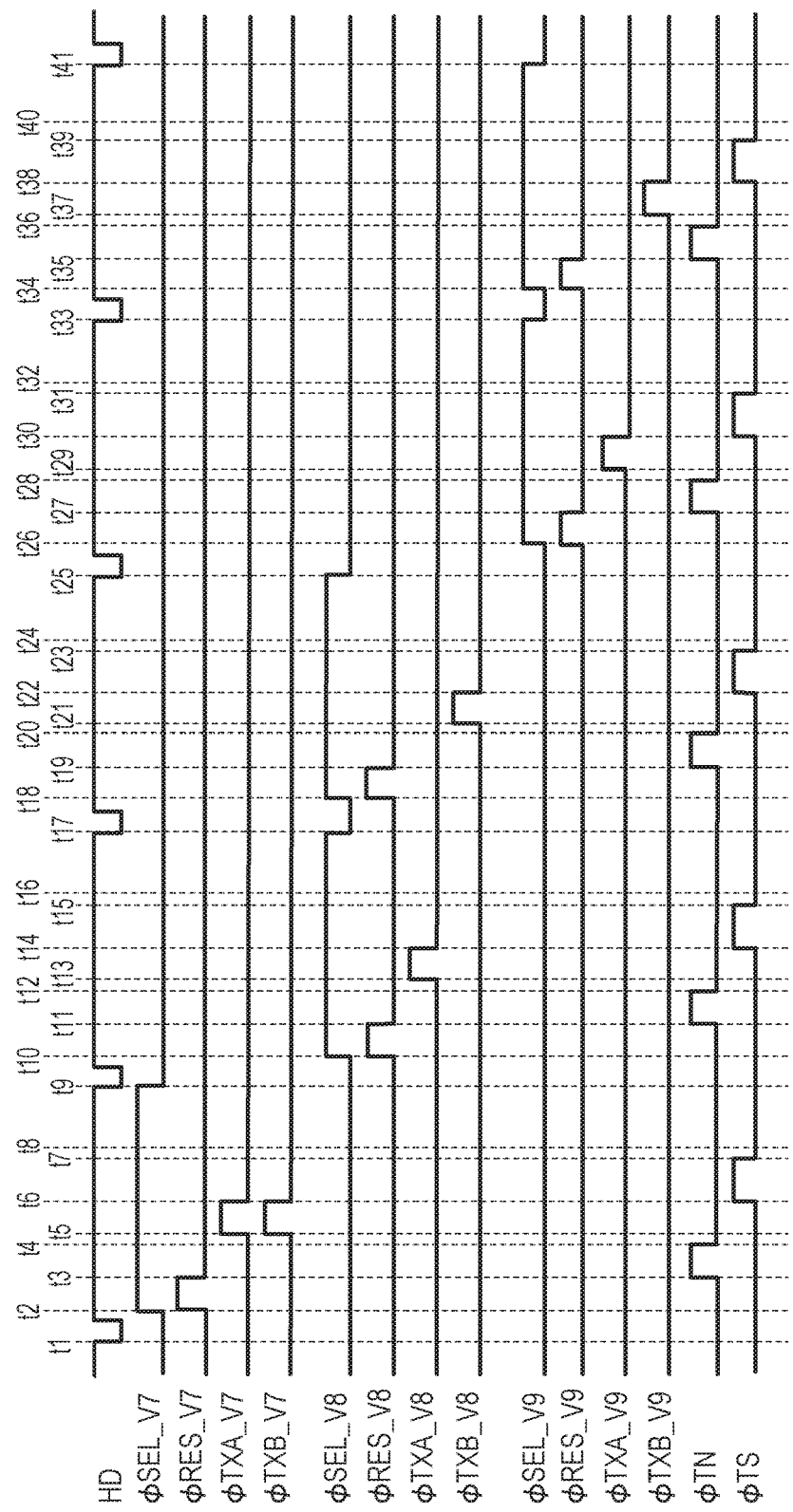
FIG. 9 is a timing chart illustrating driving of the image sensor in a case where phase difference detection is performed in the first exemplary embodiment.

Next, the first scanning and the second scanning will be described with reference to a timing chart illustrated in FIG. 9. Here, a readout operation from the V7th row which is the last row of readout in the first scanning will be described. When a horizontal synchronization signal HD is input at a time t1 of FIG. 9, φSEL_V7 which selects a pixel group in the V7th row becomes at H at a time t2 after a predetermined time period, and the selection transistor 506 of each of pixels in the V7th row is turned on. Thereby, a signal according to an input of the amplifying transistor 504 appears in the vertical output line 509. At the same time, a reset signal φRES_V7 of each of the pixels in the V7th row becomes at H, and the reset transistor 505 of each of the pixels of the V7th row is turned on.

Thereafter, the reset signal φRES_V7 becomes at L at a time t3 after a predetermined time period, and a reset operation is released. Then, a signal level in a state where the reset is released appears in the vertical output line 509. At the same time, the control signal φTN becomes at H at the time t3, and a signal obtained by amplifying, by the column amplifier 401, the signal level of the vertical output line 509 when the reset is released appears in the noise component holding capacitance CTkN. When the control signal φTN becomes at L at a time t4, the signal level after the reset is released is to be held in the noise component holding capacitance CTkN.

Next, in order to turn on the transfer transistors 507 and 508 of respective A pixels and B pixels in the V7th row, control signals φTXA_V7 and φTXB_V7 become at H at a time t5. With this operation, signal charges of the A pixels and the B pixels are transferred to the FD unit 503 together. When the transfer transistors 507 and 508 are turned off at a time t6 further after a predetermined time period, the signal charges of the A pixels and the B pixels are held by the FD unit 503. Further, when the control signal φTS becomes at H at the time t6, a signal obtained by amplifying a signal level of the vertical output line 509, which is according to the signal charges, by the column amplifier 401 appears in the signal component holding capacitance CTkS. When φTS becomes at L at a time t7, the signal level according to the signal charges is to be held in the signal component holding capacitance CTkS.

At this point, an output of each of the pixels in the V7th row immediately after the reset is released is held in the noise component holding capacitance CTkN in a corresponding column, and an output according to the signal charges is held in the signal component holding capacitance CTkS in the corresponding column. Thereafter, by sequentially connecting the noise component holding capacitance CTkN and the signal component holding capacitance CTkS of each column to the output amplifier 411 by the not-illustrated horizontal transfer circuit and multiplying a differential value thereof by the predetermined gain to output the resultant, readout of the composed signals in the V7th row is completed. Though the operation in the V7th row has been described here, operations in the V0th to V6th rows are similar.

Next, when a next horizontal synchronization signal HD is input at a time t9, φSEL_V7 which has been selecting the V7th row until then becomes at L. Then, φSEL_V8 which selects a pixel group in the V8th row becomes at H at a time t10 after a predetermined time period, and the selection transistor 506 of each of pixels in the V8th row is turned on. Thereby, a signal according to an input of the amplifying transistor 504 appears in the vertical output line 509. At the same time, a reset signal φRES_V8 of each of the pixels in the V8th row becomes at H, and the reset transistor 505 of each of the pixels of the V8th row is turned on.

Thereafter, the reset signal φRES_V8 becomes at L at a time t11 after a predetermined time period, and a reset operation is released. Then, a signal level in a state where the reset is released appears in the vertical output line 509. At the same time, the control signal φTN becomes at H at the time t11, and a signal obtained by amplifying, by the column amplifier 401, the signal level of the vertical output line 509 when the reset is released appears in the noise component holding capacitance CTkN. When φTN becomes at L at a time t12, the signal level after the reset is released is to be held in the noise component holding capacitance CTkN.

Next, in order to turn on the transfer transistor 507 of only each of A pixels of the pixels in the V8th row, a control signal φTXA_V8 becomes at H and φTXB_V8 becomes at L at a time t13. With this operation, signal charges of only the A pixels are transferred to the FD unit 503. When the transfer transistor 507 is turned off at a time t14 further after a predetermined time period, the signal charges of only the A pixels are held by the FD unit 503 with this operation. Further, when the control signal φTS becomes at H at the time t14, a signal obtained by amplifying a signal level of the vertical output line 509, which is according to the signal charge, by the column amplifier 401 appears in the signal component holding capacitance CTkS. When φTS becomes at L at a time t15, the signal level according to the signal charge is to be held in the signal component holding capacitance CTkS.

At this point, an output of each of the pixels in the V8th row immediately after the reset is released is held in the noise component holding capacitance CTkN in a corresponding column, and an output according to the signal charge is held in the signal component holding capacitance CTkS in the corresponding column. Thereafter, by sequentially connecting the noise component holding capacitance CTkN and the signal component holding capacitance CTkS of each column to the output amplifier 411 by the not-illustrated horizontal transfer circuit and multiplying a differential value thereof by the predetermined gain to output the resultant, readout of signals of only the A pixels in the V8th row is completed.

Next, when a next horizontal synchronization signal HD is input at a time t17, φSEL_V8 which has been selecting the V8th row until then becomes at L. Then, φSEL_V8 which selects the pixel group in the V8th row becomes at H again at a time t18 after a predetermined time period, and the selection transistor 506 of each of the pixels in the V8th row is turned on. Thereby, a signal according to an input of the amplifying transistor 504 appears in the vertical output line 509. At the same time, the reset signal φRES_V8 of each of the pixels in the V8th row becomes at H, and the reset transistor 505 of each of the pixels of the V8th row is turned on.

Thereafter, the reset signal φRES_V8 becomes at L at a time t19 after a predetermined time period, and a reset operation is released. Then, a signal level in a state where the reset is released appears in the vertical output line 509. At the same time, the control signal φTN becomes at H at the time t19, and a signal obtained by amplifying, by the column amplifier 401, the signal level of the vertical output line 509 when the reset is released appears in the noise component holding capacitance CTkN. When φTN becomes at L at a time t20, the signal level after the reset is released is to be held in the noise component holding capacitance CTkN.

Next, in order to turn on the transfer transistor 508 of only each of B pixels of the pixels in the V8th row, the control signal φTXB_V8 becomes at H and φTXA_V8 becomes at L at a time t21. With this operation, signal charges of only the B pixels are transferred to the FD unit 503. When the transfer transistor 508 is turned off at a time t22 further after a predetermined time period, the signal charges of only the B pixels are held by the FD unit 503 with this operation. Further, when the control signal φTS becomes at H at the time t22, a signal obtained by amplifying a signal level of the vertical output line 509, which is according to the signal charge, by the column amplifier 401 appears in the signal component holding capacitance CTkS. When φTS becomes at L at a time t23, the signal level according to the signal charge is to be held in the signal component holding capacitance CTkS.

At this point, an output of each of the pixels in the V8th row immediately after the reset is released is held in the noise component holding capacitance CTkN in the corresponding column, and an output according to the signal charge is held in the signal component holding capacitance CTkS in the corresponding column. Thereafter, by sequentially connecting the noise component holding capacitance CTkN and the signal component holding capacitance CTkS of each column to the output amplifier 411 by the not-illustrated horizontal transfer circuit and multiplying a differential value thereof by the predetermined gain to output the resultant, readout of signals of only the B pixels in the V8th row is completed.

Next, when a next horizontal synchronization signal HD is input at a time t25, φSEL_V8 which has been selecting the V8th row until then becomes at L. Then, φSEL_V9 which selects a pixel group in the V9th row becomes at H at a time t26 after a predetermined time period, and the selection transistor 506 of each of pixels in the V9th row is turned on. Thereby, a signal according to an input of the amplifying transistor 504 appears in the vertical output line 509. At the same time, a reset signal φRES_V9 of each of the pixels in the V9th row becomes at H, and the reset transistor 505 of each of the pixels of the V9th row is turned on.

Thereafter, the reset signal φRES_V9 becomes at L at a time t27 after a predetermined time period, and a reset operation is released. Then, a signal level in a state where the reset is released appears in the vertical output line 509. At the same time, the control signal φTN becomes at H at the time t27, and a signal obtained by amplifying, by the column amplifier 401, the signal level of the vertical output line 509 when the reset is released appears in the noise component holding capacitance CTkN. When φTN becomes at L at a time t28, the signal level after the reset is released is to be held in the noise component holding capacitance CTkN.

Next, in order to turn on the transfer transistor 507 of only each of A pixels of the pixels in the V9th row, a control signal φTXA_V9 becomes at H and φTXB_V9 becomes at L at a time t29. With this operation, signal charges of only the A pixels are transferred to the FD unit 503. When the transfer transistor 507 is turned off at a time t30 further after a predetermined time period, the signal charges of only the A pixels are held by the FD unit 503 with this operation. Further, when the control signal φTS becomes at H at the time t30, a signal obtained by amplifying a signal level of the vertical output line 509, which is according to the signal charge, by the column amplifier 401 appears in the signal component holding capacitance CTkS. When φTS becomes at L at a time t31, the signal level according to the signal charge is to be held in the signal component holding capacitance CTkS.

At this point, an output of each of the pixels in the V9th row immediately after the reset is released is held in the noise component holding capacitance CTkN in a corresponding column, and an output according to the signal charge is held in the signal component holding capacitance CTkS in the corresponding column. Thereafter, by sequentially connecting the noise component holding capacitance CTkN and the signal component holding capacitance CTkS of each column to the output amplifier 411 by the not-illustrated horizontal transfer circuit and multiplying a differential value thereof by the predetermined gain to output the resultant, readout of signals of only the A pixels in the V9th row is completed.

Next, when a next horizontal synchronization signal HD is input at a time t33, φSEL_V9 which has been selecting the V9th row until then becomes at L. Then, φSEL_V9 which selects the pixel group in the V9th row becomes at H again at a time t34 after a predetermined time period, and the selection transistor 506 of each of the pixels in the V9th row is turned on. Thereby, a signal according to an input of the amplifying transistor 504 appears in the vertical output line 509. At the same time, the reset signal φRES_V9 of each of the pixels in the V9th row becomes at H, and the reset transistor 505 of each of the pixels of the V9th row is turned on.

Thereafter, the reset signal φRES_V9 becomes at L at a time t35 after a predetermined time period, and a reset operation is released. Then, a signal level in a state where the reset is released appears in the vertical output line 509. At the same time, the control signal φTN becomes at H at the time t35, and a signal obtained by amplifying, by the column amplifier 401, the signal level of the vertical output line 509 when the reset is released appears in the noise component holding capacitance CTkN. When φTN becomes at L at a time t36, the signal level after the reset is released is to be held in the noise component holding capacitance CTkN.

Next, in order to turn on the transfer transistor 508 of only each of B pixels of the pixels in the V9th row, the control signal φTXB_V9 becomes at H and φTXA_V9 becomes at L at a time t37. With this operation, signal charges of only the B pixels are transferred to the FD unit 503. When the transfer transistor 508 is turned off at a time t38 further after a predetermined time period, the signal charges of only the B pixels are held by the FD unit 503 with this operation. Further, when the control signal φTS becomes at H at the time t38, a signal obtained by amplifying a signal level of the vertical output line 509, which is according to the signal charge, by the column amplifier 401 appears in the signal component holding capacitance CTkS. When φTS becomes at L at a time t39, the signal level according to the signal charge is to be held in the signal component holding capacitance CTkS.

At this point, an output of each of the pixels in the V9th row immediately after the reset is released is held in the noise component holding capacitance CTkN in the corresponding column, and an output according to the signal charge is held in the signal component holding capacitance CTkS in the corresponding column. Thereafter, by sequentially connecting the noise component holding capacitance CTkN and the signal component holding capacitance CTkS of each column to the output amplifier 411 by the not-illustrated horizontal transfer circuit and multiplying a differential value thereof by the predetermined gain to output the resultant, readout of signals of only the B pixels in the V9th row is completed.

Thereafter, by similarly repeating the readout operation of signals of A pixels and B pixels in the V10th and the succeeding rows, a desired readout operation is completed.

Shooting Operation

Next, summary of a shooting operation of the image capturing apparatus in the first exemplary embodiment will be described based on a flowchart of FIG. 10. The CPU 105 waits until the power switch 109 is turned on (S11). When the power switch 109 is turned on (ON at S11), the CPU 105 judges whether or not electric energy necessary for shooting remains in a battery (S12).

As a result thereof, in a case where electric energy necessary for shooting does not remain in the battery (NO at S12), the CPU 105 displays a warning message therefor on the display unit 114 (S17), returns to S11, and waits until the power switch 109 is turned on again.

In a case where electric energy necessary for shooting remains in the battery (YES at S12), the CPU 105 checks the recording medium 108 (S13). The check is performed by judging whether or not the recording medium 108 is mounted on the image capturing apparatus and is in a state of being capable of recording data having a predetermined capacity or more. In a case where the recording medium 108 is not mounted on the image capturing apparatus or a case where a capacity which is able to record data therein is insufficient (NO at S13), the CPU 105 displays a warning message therefor on the display unit 114 (S17) and returns to S11.

In a case where the recording medium 108 is mounted and in the state of being capable of recording (YES at S13), the CPU 105 judges which of a still image shooting mode and a moving image shooting mode a shooting mode is set to be with the mode dial 112 (S14). Then, the CPU 105 performs still image shooting processing (S15) in a case where the still image shooting mode is set, and performs moving image shooting processing (S16) in a case where the moving image shooting mode is set.

Figure 11:
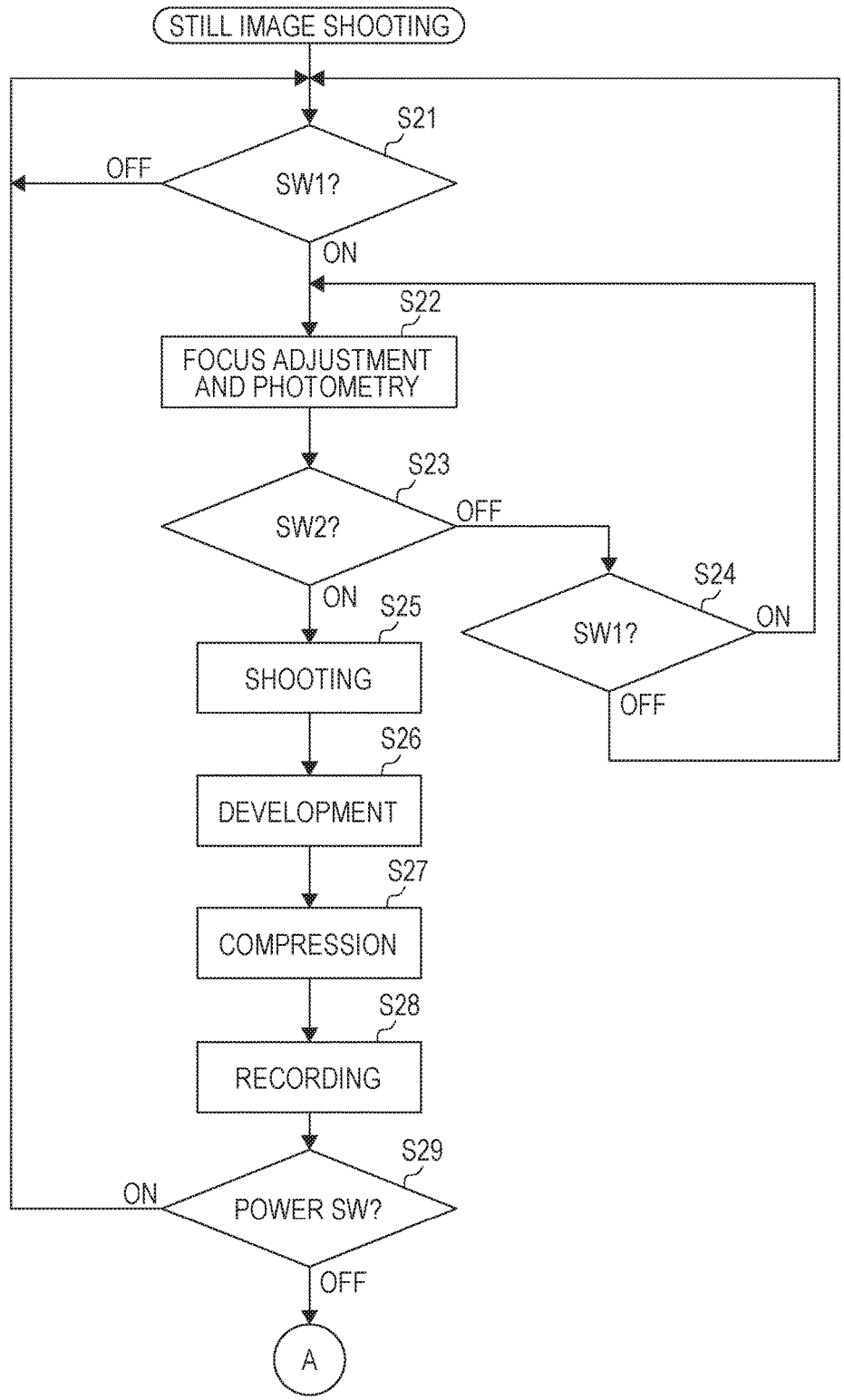
FIG. 11 is a flowchart illustrating still image shooting processing in the first exemplary embodiment.

Here, the still image shooting which is performed at S15 will be described in detail with reference to a flowchart of FIG. 11. In the still image shooting processing, first, the CPU 105 waits until the shutter switch SW1 (110) is turned on (S21). When the shutter switch SW1 (110) is turned on (ON at S21), the CPU 105 uses photometry information from a not-illustrated photometry control unit to thereby perform photometry processing by which an aperture of the aperture 204 of the shooting lens 202 and a shutter speed are determined. Further, by using phase difference detection information from the AF unit 209, the CPU 105 performs focus adjustment processing by which the focus adjustment lens group 205 of the shooting lens 202 focuses on an object position (S22).

Next, the CPU 105 judges whether or not the shutter switch SW2 (111) is tuned on (S23). As a result thereof, in a case where the shutter switch SW2 (111) is not turned on (OFF at S23), the CPU 105 judges whether or not the shutter switch SW1 (110) is kept in an on state (S24). In a case where the shutter switch SW1 (110) is kept in the on state (ON at S24), the CPU 105 returns to S22 to perform focus adjustment processing again, and judges, at S23, whether or not the shutter switch SW2 (111) is turned on. On the other hand, in a case where the shutter switch SW1 (110) is not kept in the on state (OFF at S24), the CPU 105 returns to S21, and waits until the shutter switch SW1 is turned on again.

In the case of judging, at S23, that the shutter switch SW2 (111) is turned on, the CPU 105 executes shooting processing (S25). At a time of still image shooting, with a driving method in which the above-described phase difference detection is not performed, composed signals of A pixels and B pixels are read out from an entirety of a region of the image sensor 101 as illustrated in FIG. 8A. Thereby, it is possible to output an electric charge signal which is generated in an entirety of each pixel arranged under the same micro lens 601 and which is suitable for image generation.

Next, the CPU 105 causes the DSP 103 to execute development processing for the obtained composed signals (image data) (S26). Furthermore, the CPU 105 causes the DSP 103 to execute compression processing for the image data subjected to the development processing, and to store the image data subjected to the compression processing in a free space of the RAM 107 (S27). Next, the CPU 105 causes the DSP 103 to execute readout of the image data stored in the RAM 107 and recording processing in the recording medium 108 (S28).

Then, the CPU 105 checks an on/off state of the power switch 109 (S29). In a case where the power switch 109 remains in the on state (ON at S29), the CPU 105 returns to S21 and prepares for next shooting. On the other hand, in a case where the power switch 109 has been brought into the off state (OFF at S29), the CPU 105 returns to S11 of FIG. 10, and waits until the power switch 109 is turned on again.

Next, the moving image shooting processing which is performed at S16 will be described in detail with reference to a flowchart of FIG. 12. Note that, in the first exemplary embodiment, when the moving image shooting mode is set, the focal plane shutter 210 is opened and a monitoring operation by which the image data read out from the image sensor 101 is continuously developed and displayed on the display unit 114 is performed. In addition, it is set that moving image data is continuously recorded in the recording medium 108 during a period in which the shutter switch SW2 (111) is in an on state. In order to go out of the moving image shooting mode, setting of the mode dial 112 may be changed to a mode other than the moving image shooting mode, or the power switch 109 may be turned off.

First, the CPU 105 is set in the moving image mode which is selected with the mode dial 112 (S31), and performs opening operations of the main mirror 207, the sub mirror 208, and the focal plane shutter 210 (S32). Thereby, as illustrated in FIG. 2B, an object image always enters the image sensor 101.

Next, the CPU 105 judges whether or not the shutter switch SW2 (111) is turned on (S33). In a case where the shutter switch SW2 (111) is turned on (ON at S33), the CPU 105 starts a recording operation by which moving image data is written in the recording medium 108 (S35). On the other hand, in a case where the shutter switch SW2 (111) is in an off state (OFF at S33), when the recording operation by which moving image data is written in the recording medium 108 is currently being executed, the CPU 105 stops the recording operation (S34). In this manner, the CPU 105 continues recording processing of moving image data while the shutter switch SW2 (111) is in the on state, and stops the recording processing of moving image data at a time point when the shutter switch SW2 (111) is turned off. However, control may be performed so that the recording operation is stopped at a time point when a predetermined time elapses or at a time point when a remaining capacity of the recording medium 108 becomes short, even if the shutter switch SW2 (111) is not turned off.

After S34 or S35, the CPU 105 performs exposure control (S36) in order to perform the monitoring operation by which monitor display of image data on the display unit 114 is repeated. In the exposure control, an exposure amount is judged based on image data obtained by preceding shooting, and the aperture 204 of the shooting lens 202 and gain inside the AFE 102 are set so that the exposure amount becomes appropriate. However, since preceding data does not exist at a time of first moving image shooting, initial values are set for the aperture 204 of the shooting lens 202 and the gain inside the AFE 102.

Figure 13A:
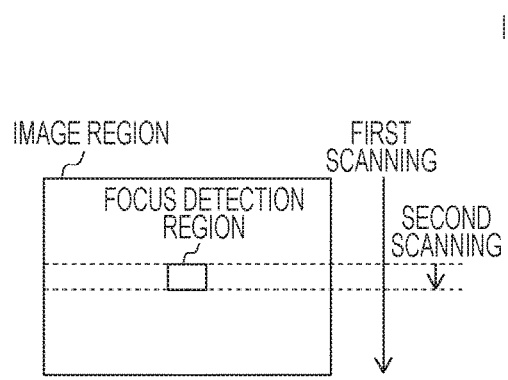
FIGS. 13A and 13B are views each illustrating a relation between a focus detection region and a readout region in the first exemplary embodiment.
Figure 13B:
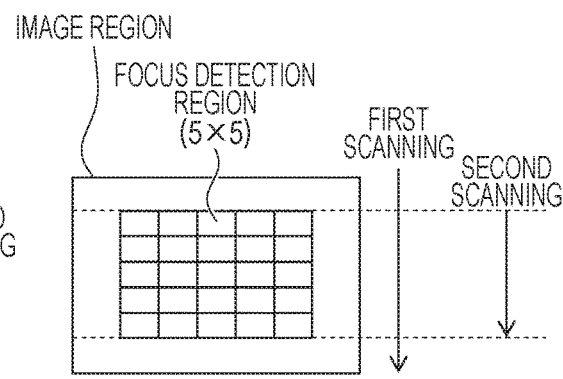

Next, the CPU 105 performs shooting processing at S37. In the moving image shooting mode, driving accompanied by the above-described phase difference detection is performed. First, as described with FIGS. 8B and 8C, for example, one row of pixels on the image sensor 101 is read out in the vertical direction for every first period, in the first scanning. After the first scanning, the second scanning is performed in order to obtain a phase difference detection signal. A row range to be read out in the second scanning is designated in accordance with a focus detection region in which AF is performed. FIGS. 13A and 13B illustrate a relation between the focus detection region in which AF is performed and a target row range of the second scanning. FIG. 13A illustrates a case where one-point range-finding frame is set as the focus detection region. Moreover, FIG. 13B illustrates a case where a range-finding frame divided into 5×5 is set as the focus detection region. The CPU 105 sets the focus detection region in accordance with a not-illustrated range-finding frame mode which is set by a user. The CPU 105 sets a narrowest row range, which includes the focus detection region, as the target row range of the second scanning. For example, in a case where the range-finding frame mode is an any-one-point mode, the focus detection region is set as illustrated in FIG. 13A, and in a case where the range-finding frame mode is an automatic selection mode, the focus detection region is set as illustrated in FIG. 13B. Alternatively, the focus detection region may be set in accordance with an operation state of AF. For example, in a case where an object position for which AF is performed is not specified, the focus detection region illustrated in FIG. 13B is set, and, in a case where the object position for which AF is performed is specified, the focus detection region illustrated in FIG. 13A is set.

Figures 14A, 14B, 14C:
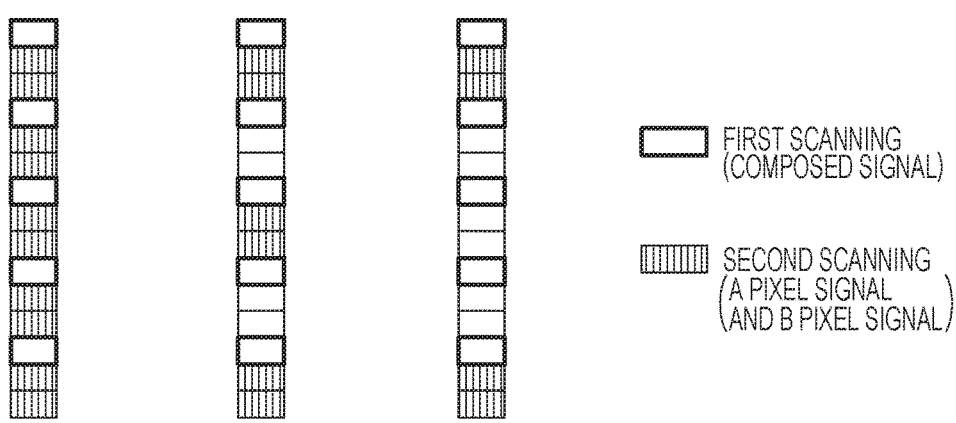
FIGS. 14A, 14B, and 14C are views illustrating setting examples of a second period and a thinning rate in second scanning in the first exemplary embodiment.

In addition, by instructing the timing generator 104 on the second period which is a period of a target row in which readout is performed in the second scanning and a thinning rate in each second period, the CPU 105 switches density of phase difference detection signals to be read out. FIGS. 14A, 14B, and 14C are views illustrating setting examples of the second period and the thinning rate in the second scanning. Each of FIGS. 14A, 14B, and 14C illustrates an example of a case where the first period includes three rows. That is, in FIGS. 14A, 14B, and 14C, target rows (rows each of which is surrounded by a thick frame) of composed signals read out in the first scanning are provided in three-row periods.

FIG. 14A illustrates an example of a case where each second period includes four rows and the thinning rate is 0. In FIG. 14A, all of rows in which readout is not performed in the first scanning are set as target rows of readout in the second scanning, which are indicated with vertical lines, so that it is possible to obtain phase difference detection signals with high density. FIG. 14B illustrates an example of a case where each second period includes four rows and the thinning rate is two rows out of four rows. In FIG. 14B, half of rows in which readout is not performed in the first scanning are set as target rows of readout in the second scanning, so that higher-speed readout is enabled by reducing the number of rows to be read out compared with that of FIG. 14A. FIG. 14C illustrates an example of a case where each second period includes eight rows and the thinning rate is six rows out of eight rows. In FIG. 14C, target rows of readout in the second scanning are further thinned, so that even higher-speed readout is enabled.

The CPU 105 switches the second period of a target row and the thinning rate of readout in the second scanning in accordance with the range-finding frame mode, brightness of an object, or the like. For example, in FIG. 14A, by supplying the phase difference detection signals with high density to the DSP 103 of a succeeding stage, it is possible to improve an effect of noise reduction and improve phase difference detection performance for an object having lower-light intensity or lower contrast or the like. In FIG. 14B, by reducing the number of rows to be read out, a readout time is shortened and a frame rate becomes higher, so that it is possible to improve an AF speed. Moreover, in FIG. 14C, for example, in a case where an object position for which AF is performed is not specified, when a focus detection region having a wide range as illustrated in FIG. 13B is set and high-speed readout is performed, it becomes possible to perform phase difference detection in the wide range while maintaining a frame rate. In this case, phase difference detection signals to be read out have low density, so that there is a possibility that degradation of phase difference detection performance is caused, but the phase difference detection performance only needs to satisfy performance necessary for specifying an object position for which AF is performed (range-finding point selection). By performing switch to FIG. 14A or FIG. 14B in a focusing operation after specifying an object, it is possible to perform phase difference detection with high accuracy.

The phase difference detection signals read out in the second scanning are transferred to the AF correction unit 1009 in the DSP 103. Then, correction for each pixel and correction for coping with an optical condition at a time of shooting are performed.

Thereafter, a result of the correction is transferred to the focus detection calculation unit 1006, a phase difference detection result is calculated here by using known correlation calculation or the like based on signals of an A pixel sequence and a B pixel sequence which are two types of pixel outputs and formed from different pupil regions, and a focus detection operation is performed. The CPU 105 receives a result of the calculation, and performs position control of the focus adjustment lens group 205 in the shooting lens 202, and thereby autofocus control is performed (S38).

On the other hand, for the composed signals in the image sensor 101, which are obtained in the first scanning, the image correction unit 1008 digitally corrects an error of sensitivity or a dark level from an ideal state of the image sensor 101. Further, correction processing of a defective pixel of the image sensor 101 is performed in the development unit 1001, development processing (S39) is performed, and compression processing (S40) in the compression unit 1002 is performed. At this time, when the shutter switch SW2 (111) is in the on state and a moving image is being recorded, a compressed image signal is recorded in the recording medium 108. Then, results of the processing are displayed on the display unit 114 by using the LCD display controller 1005 (S41). By repeating the above-described operation in a frame rate necessary for display, an operation for a moving image is enabled.

Figure 10:
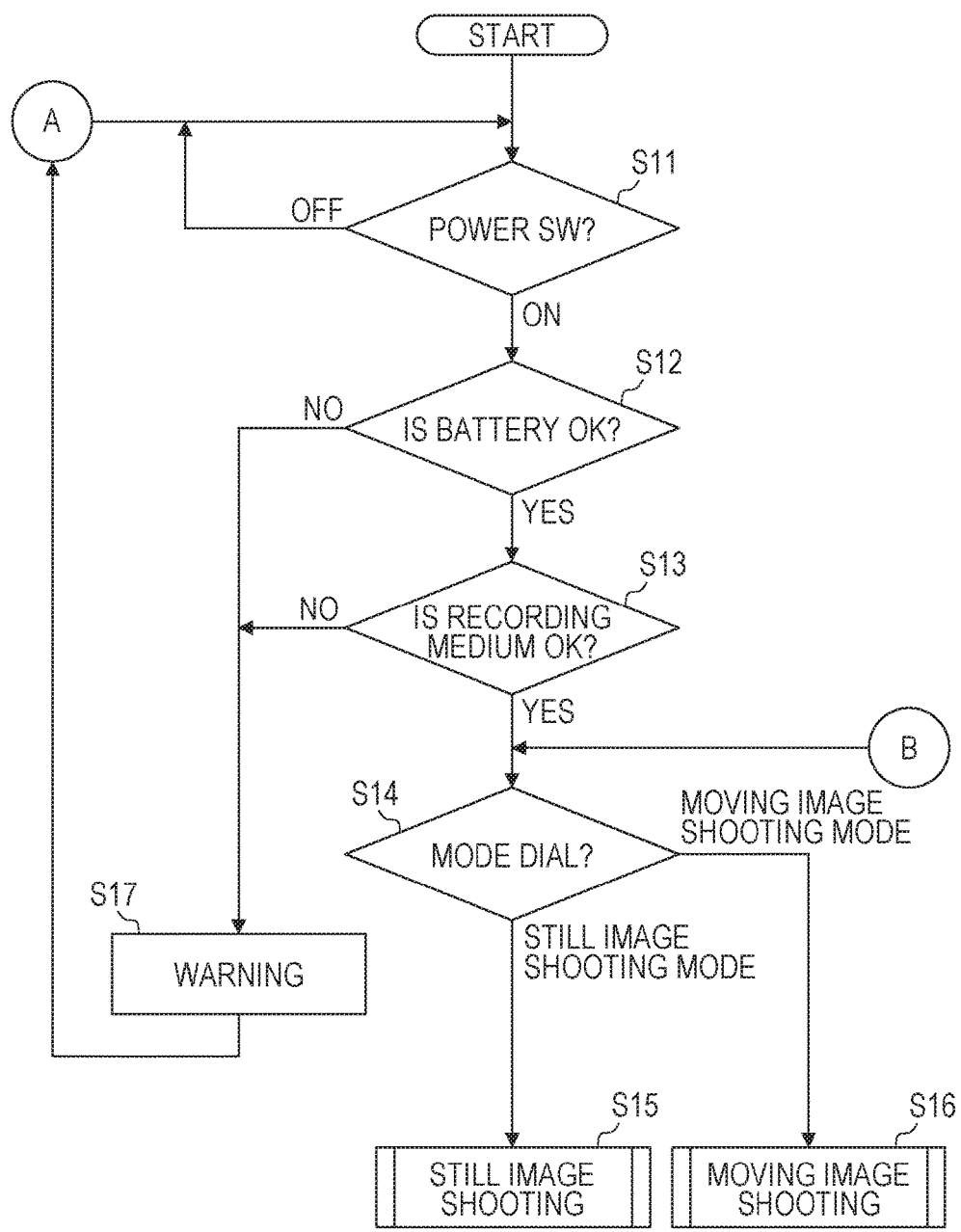
FIG. 10 is a flowchart illustrating a shooting operation of the image capturing apparatus in the first exemplary embodiment.

Next, the CPU 105 judges whether the power switch 109 is turned off (S42), and performs moving image finishing processing (S44) and returns to S11 of FIG. 10 in a case where the power switch 109 is turned off (OFF at S42). On the other hand, in a case where the power switch 109 is kept in the on state (ON at S42), the CPU 105 checks the mode dial 112 (S43). The CPU 105 returns to S33 when the mode dial 112 is kept to be set as the moving image shooting mode. The CPU 105 performs moving image finishing processing (S45) and returns to S14 of FIG. 10 when the mode dial 112 is switched to the still image mode.

In the moving image finishing processing at S44 or S45, in a case where a recording operation is currently being performed, the recording operation is stopped, driving of the image sensor 101 is stopped, and readout processing of the DSP 103 is stopped. Furthermore, the focal plane shutter 210 is closed, and the main mirror 207 and the sub mirror 208 are lowered.

In this manner, at a time of the moving image shooting mode, it becomes possible to generate a moving image by using composed signals which are read out in a vertical direction in the first scanning while performing thinning, and to calculate phase difference by using phase difference detection signals which are read out in the second scanning of a latter half. Then, the first scanning and the second scanning are alternately repeated while moving image shooting is performed, and it is thereby possible to realize autofocus control using only an output of the image sensor while maintaining quality for image data of the moving image.

In addition, since the image data is output in an order of the composed signals for image generation and the phase difference detection signals, a processing content and correction processing thereof are also able to be separated in time. Thus, it becomes unnecessary to perform processing in which a phase difference detection signal is separated from read signals to sort the read signals into ones for development processing and ones for phase difference detection calculation in the focus detection calculation unit 1006, or processing in which a phase difference detection signal is corrected for image data generation. Accordingly, it becomes possible to sufficiently enhance efficiency of processing.

Moreover, in the moving image shooting mode in the first exemplary embodiment, a phase difference detection signal is not read out when a composed signal for a moving image is read out. Therefore, it is not necessary to fear that image quality is lowered due to the phase difference detection signal when obtaining image data of the moving image. Further, also as to the focus detection operation, by switching scanning of the vertical scanner 520, detection in any region and in any thinning period is enabled.

Note that, in the first exemplary embodiment, a case in which a composed signal is read out first in the first scanning to generate a moving image and a phase difference detection signal is thereafter read out in the second scanning to calculate autofocus information has been described. However, the disclosure is not limited thereto, and a phase difference detection signal may be read out first in the second scanning to calculate autofocus information, and a composed signal may be thereafter read out in the first scanning to generate a moving image. In this case, since the autofocus information is able to be detected first, there is an advantage to be able to drive a lens more quickly. This is able to be realized easily since only change in a scanning order of the vertical scanner 520 is required. In addition, it is also possible to set and switch, from the CPU 105, from which driving method to perform first, for example, for each frame.

As described above, according to the first exemplary embodiment, a pixel region having a plurality of photoelectric conversion units is included, and, by adding a function of a logic circuit in the vertical scanner, it is possible to perform switching, for each row to be read out, between readout of an output of an A+B pixel and readout of an A pixel and a B pixel. Thereby, it becomes possible to read out a necessary pixel signal with accuracy sufficient for phase difference detection without increasing a circuit scale and without deteriorating quality of an image.

Moreover, since a pixel signal for phase difference detection is read out only in a necessary region, it is not necessary to read out composed signals and phase difference detection signals of all pixels, so that a readout time is substantially shortened, thus making it possible to realize a higher-speed readout operation.

In addition, it is not necessary to perform control by which a horizontal scanning period changes complexly, for example, control so that both of a signal for an image and a pixel signal for phase difference detection are read out only in a specified row, resulting in that it is easy to be compatible with a conventional system.

Further, even in a case where, in accordance with a moving image recording mode (resolution, a frame rate, or the like), the first period varies, for example, to be a three-row period and a five-row period, by setting the same second period, it becomes possible to maintain phase difference detection performance which does not depend on the moving image recording mode.

Furthermore, it is also possible to change setting of the vertical scanner 520 in accordance with a shooting condition (the range-finding frame mode, the operation state of AF, the moving image recording mode, or the like) or a shooting scene (brightness or low contrast of an object, or the like). Specifically, in a case where an evaluation value based on brightness of an object is equal to or more than a first threshold, the second period is set to be longer than the first period, and, in a case where the evaluation value based on the brightness of the object is less than a second threshold, the second period is set to be shorter than the first period (for example, one row). Alternatively, the second period or the thinning rate is switched in accordance with a size of a focus detection region. In this manner, it is possible to easily realize readout of a pixel signal for phase difference detection according to a situation, and it becomes possible to improve AF performance, for example, by making speed of AF higher or enlarging a low-light intensity limit, a low luminance limit, or a range of a focus detection region.

In this manner, in accordance with setting of the vertical scanner 520, degrees of freedom for setting of a row used for image generation and setting of a row used for phase difference detection are extremely high, so that it is possible to provide any setting in accordance with quality of an image, accuracy of phase difference detection, a detection region, a corresponding readout speed (frame rate), or the like.

As above, in the present exemplary embodiment, a scanner (the vertical scanner 520, the timing generator 104, and the CPU 105) that controls scanning for reading out a first signal and a second signal for each row is included. The scanner performs first scanning by which the first signal is read out by being thinned out in a first period, and second scanning by which the second signal is read out in a row, in which readout is not performed in the first scanning, by being thinned out in each second period with a predetermined thinning rate. Thereby, it is possible to perform phase difference detection with high accuracy without increasing a circuit scale of an image sensor or a readout time.

<Modified Embodiment>

In addition to the first exemplary embodiment described above, free development is allowed, and it is possible to freely set the first period, the second period, and the thinning rate in accordance with desired accuracy of a composed signal for image generation and a phase difference detection signal or the like.

Though application to a case of a still image for which readout from pixels of all rows is performed is not referred to in the above-described exemplary embodiment, the disclosure is applicable also to the case of readout for a still image by performing the second scanning for a specified row during readout of all of the rows and performing phase difference detection. However, in this case, in the row in which the second scanning is performed, it is necessary to generate a signal for image generation by adding a signal from an A pixel and a signal from a B pixel in processing of a succeeding stage such as the DSP 103.

In the description of the above-described exemplary embodiment, the first scanning for image generation and the second scanning for phase difference detection are performed in combination. However, there is no limitation thereto, and it is possible to perform only the first scanning in a case where phase difference detection is unnecessary. On the other hand, in a case where a composed signal for image generation is unnecessary and only phase difference detection is necessary to be performed, for example, in a case where readout only for AF is performed, it is possible to perform only the second scanning.

In addition, though a readout method in a horizontal direction is not referred to in the above-described exemplary embodiment, the disclosure in the above-described exemplary embodiment is applicable also in a case where thinning is performed in the horizontal direction or processing of homochromatic addition or averaging is performed.

The disclosure is able to be realized by processing in which a program which realizes one or more functions of the above-described exemplary embodiment is supplied to a system or an apparatus via a network or a storage medium and one or more processors in a computer of the system or the apparatus reads out and executes the program. Further, the disclosure is also able to be realized by a circuit (for example, an ASIC) which realizes one or more functions.

Note that, each of the aforementioned exemplary embodiments merely explains a specific example for carrying out the disclosure, and technical scope of the disclosure should not be thereby interpreted limitedly. That is, the disclosure is able to be carried out in various forms without departing from a technical idea or main feature thereof.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') of an article of manufacture to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-243320, filed Dec. 14, 2015, which is hereby incorporated by reference herein in its entirety.

What is claimed is:

1. An image capturing apparatus, comprising:
an image sensor in which unit pixels that perform photoelectric conversion of light from an object are arrayed in a matrix manner and which outputs a first signal for image generation based on an electric charge generated in each of the unit pixels and a second signal for phase difference detection based on an electric charge generated in a partial region of each of the unit pixels; and
a scanner that controls scanning for reading out the first signal and the second signal for each row, wherein
the scanner performs
first scanning by which the first signal is read out by being thinned out in a first period, and
second scanning by which the second signal is read out in a row, in which the first signal is not read out in the first scanning, by being thinned out in each second period with a predetermined thinning rate, wherein the scanner performs the first scanning and second scanning sequentially in one frame, wherein the time period of reading out the second signal for each row in the second scanning is longer than that of reading out the first signal for each row in the first scanning.

2. The image capturing apparatus according to claim 1, wherein the scanner performs switching of a target row range of the second scanning, the second period, and the thinning rate in accordance with a shooting condition or a shooting scene.

3. The image capturing apparatus according to claim 2, wherein the shooting scene includes an evaluation value based on brightness of the object, and the scanner sets the second period to be longer than the first period, in a case where the evaluation value based on the brightness of the object is equal to or more than a first threshold.

4. The image capturing apparatus according to claim 2, wherein the shooting scene includes an evaluation value based on brightness of the object, and the scanner sets the second period to be shorter than the first period, in a case where the evaluation value based on the brightness of the object is less than a second threshold.

5. The image capturing apparatus according to claim 2, wherein the shooting condition includes a focus detection region that is designated as a range in which range finding is performed, and the scanner sets, as the target row range of the second scanning, a narrowest row range including the focus detection region.

6. The image capturing apparatus according to claim 5, wherein the scanner performs switching of the second period or the thinning rate in accordance with a size of the focus detection region.

7. The image capturing apparatus according to claim 1, wherein each of the unit pixels has an A pixel and a B pixel as the partial region, the first signal is a composed signal obtained from the A pixel and the B pixel, and the second signal is a signal obtained from the A pixel and a signal obtained from the B pixel.

8. The image capturing apparatus according to claim 1, wherein the scanner performs the second scanning after performing the first scanning.

9. The image capturing apparatus according to claim 1, further comprising:

an optical system that forms, on the image sensor, an image of light from the object; and a focus adjustment unit configured to adjust a focal point of the optical system based on the second signal.

10. The image capturing apparatus according to claim 1, wherein the scanner has a still image mode and a moving image mode, and in a case that the still image mode is set to the scanner, the scanner only performs the first scanning.

11. The image capturing apparatus according to claim 1, further comprising a convertor that performs conversion of the aspect ratio for the first signal read out by being thinned out in a first period.

12. A control method of an image capturing apparatus that includes an image sensor in which unit pixels that perform photoelectric conversion of light from an object are arrayed in a matrix manner and which outputs a first signal for image generation based on an electric charge generated in each of the unit pixels and a second signal for phase difference detection based on an electric charge generated in a partial region of each of the unit pixels, the method comprising:

performing a first scanning by which the first signal is read out by being thinned out in a first period, and performing a second scanning by which the second signal is read out in a row, in which the first signal is not read out in the first scanning, by being thinned out in each second period with a predetermined thinning rate, wherein the first scanning and second scanning are performed sequentially in one frame, wherein the time period of reading out the second signal for each row in the second scanning is longer than that of reading out the first signal for each row in the first scanning.

13. An article of manufacture comprising a machine-readable storage medium containing instructions that, when executed by a processor, cause the processor to perform operations comprising:

reading out, in a first scanning, a first signal by performing thinning in a first period, the first signal being output by an image sensor in which unit pixels that perform photoelectric conversion of light from an object are arrayed in a matrix manner; and reading out, in a second scanning, a second signal in a row, in which the first signal is not read out in the first scanning, by performing thinning in each second period with a predetermined thinning rate, the second signal being output by the image sensor for phase difference detection based on an electric charge generated in a partial region of each of the unit pixels, wherein the first scanning and second scanning are performed sequentially in one frame, wherein the time period of reading out the second signal for each row in the second scanning is longer than that of reading out the first signal for each row in the first scanning.

* * * * *